United States Patent [19]

Gregoli et al.

[11] Patent Number: 5,340,467
[45] Date of Patent: Aug. 23, 1994

[54] PROCESS FOR RECOVERY OF HYDROCARBONS AND REJECTION OF SAND

[75] Inventors: Armand A. Gregoli, Tulsa; John A. Hamshar, 3rd, Owasso; Daniel P. Rimmer, Broken Arrow, all of Okla.; Erdal Yildirim, Calgary, Canada; Andrew M. Olah, Spencer, Ohio

[73] Assignee: Canadian Occidental Petroleum Ltd., Calgary, Canada

[21] Appl. No.: 782,106

[22] Filed: Oct. 24, 1991

Related U.S. Application Data

[63] Continuation-in-part of Ser. No. 341,772, Apr. 21, 1988, Pat. No. 5,083,613, which is a continuation of Ser. No. 311,133, Feb. 14, 1989, abandoned, which is a continuation-in-part of Ser. No. 218,840, Jul. 14, 1988, Pat. No. 5,000,872, which is a continuation-in-part of Ser. No. 114,204, Oct. 27, 1987, Pat. No. 4,978,365, which is a continuation-in-part of Ser. No. 934,683, Nov. 24, 1986, Pat. No. 4,725,287.

[51] Int. Cl.$^5$ .............................................. C10G 1/04
[52] U.S. Cl. .................................. 208/390; 208/391; 252/61; 252/174.21
[58] Field of Search ............ 208/390, 391; 252/61, 252/174.21

[56] References Cited

U.S. PATENT DOCUMENTS

| | | | |
|---|---|---|---|
| 932,527 | 8/1909 | Wiechmann | 210/704 |
| 3,068,167 | 12/1962 | White | 208/11 |
| 3,173,863 | 3/1965 | Oster et al. | 210/52 |
| 3,297,568 | 1/1967 | McMahon | 210/51 |
| 3,392,105 | 7/1968 | Poettmann et al. | 208/11 |
| 3,487,003 | 12/1969 | Baillie et al. | 21/1 |
| 3,509,037 | 4/1970 | Tse | 208/390 |
| 3,696,923 | 10/1972 | Miller | 209/12 |
| 3,864,251 | 2/1975 | Cymbalisty | 210/44 |
| 3,869,384 | 3/1975 | Schutte | 210/44 |
| 4,017,392 | 4/1977 | Harner et al. | 210/54 |
| 4,018,664 | 4/1977 | Bain et al. | 208/11 LE |
| 4,036,732 | 7/1977 | Irani et al. | 208/11 LE |
| 4,051,027 | 9/1977 | Batzer et al. | 210/42 R |
| 4,071,434 | 1/1978 | Gifford, II | 208/11 LE |
| 4,110,194 | 8/1978 | Peterson et al. | 208/11 LE |
| 4,152,252 | 5/1979 | Tolley et al. | 209/10 |
| 4,174,278 | 11/1979 | Tramier et al. | 210/51 |
| 4,221,661 | 9/1980 | Shimizu et al. | 210/721 |
| 4,229,281 | 10/1980 | Alquist et al. | 208/11 LE |
| 4,229,295 | 10/1980 | Krofohak | 210/723 |
| 4,294,703 | 10/1981 | Wilms et al. | 210/631 |
| 4,340,487 | 7/1982 | Lyon | 210/705 |
| 4,347,118 | 8/1982 | Funk et al. | 208/11 LE |
| 4,383,914 | 5/1983 | Kizior | 208/177 |
| 4,392,941 | 7/1983 | Roth et al. | 208/11 LE |
| 4,395,337 | 7/1983 | Ciepiela | 210/703 |
| 4,399,039 | 8/1883 | Yong | 210/728 |
| 4,416,786 | 11/1983 | Knorre et al. | 210/746 |
| 4,424,112 | 1/1984 | Rendall | 208/11 LE |
| 4,478,725 | 10/1984 | Velling et al. | 210/703 |
| 4,496,367 | 1/1985 | Mathiesen et al. | 44/280 |
| 4,507,208 | 3/1985 | Simon et al. | 210/721 |
| 4,514,305 | 4/1985 | Filby | 210/703 |

(List continued on next page.)

*Primary Examiner*—R. Bruce Breneman
*Attorney, Agent, or Firm*—John W. Carpenter

[57] ABSTRACT

A process for recovering a hydrocarbon from a hydrocarbon bearing sand comprising the steps of mixing a chemical additive with a chemical composition and with a hydrocarbon bearing sand containing hydrocarbon and residual solids including clay, at a temperature to form a slurry. The chemical composition comprises an aqueous phase and a minor amount of a chemical agent selected from the group consisting of at least one ethoxylated alkylphenol compound, at least one ethoxylated dialkylphenol compound, MIBC, SC-177, Petronate HL, Clacium Lignosulfonate and mixtures thereof. The slurry is aerated to produce essentially sludge-free tailings and a mixture of hydrocarbon, aqueous phase and residual solids including clay. The process further comprises the step of separating the mixture of the hydrocarbon, the aqueous phase and the residual solids including clay from the essentially sludge-free tailings.

42 Claims, 17 Drawing Sheets

U.S. PATENT DOCUMENTS

| | | | |
|---|---|---|---|
| 4,572,777 | 2/1986 | Peck | 208/390 |
| 4,591,443 | 5/1986 | Brown et al. | 210/747 |
| 4,612,124 | 9/1986 | Escrig | 210/721 |
| 4,676,889 | 6/1987 | Hsieh et al. | 208/390 |
| 4,702,487 | 10/1987 | Stoian et al. | 208/390 |
| 4,719,008 | 1/1988 | Sparks et al. | 208/390 |
| 4,724,084 | 2/1988 | Pakmeier et al. | 210/709 |
| 4,729,835 | 3/1988 | McNeillie et al. | 210/759 |
| 4,776,949 | 10/1988 | Leung et al. | 208/390 |
| 4,810,259 | 3/1989 | Rakitsky et al. | 44/280 |
| 4,830,738 | 5/1989 | White et al. | 209/166 |
| 4,851,129 | 7/1989 | Griffiths et al. | 210/695 |
| 4,891,131 | 1/1990 | Sadeghi et al. | 208/390 |
| 4,913,805 | 4/1990 | Chin | 209/164 |
| 4,913,826 | 4/1990 | Manning et al. | 210/707 |
| 4,929,341 | 5/1990 | Thirumalachar et al. | 208/390 |
| 4,946,597 | 8/1990 | Sury | 210/705 |
| 4,948,516 | 8/1990 | Fisher et al. | 210/751 |
| 4,966,685 | 10/1990 | Hall et al. | 208/391 |
| 4,968,412 | 11/1990 | Guymon | 208/390 |
| 5,000,860 | 8/1991 | Drewry | 210/721 |
| 5,009,773 | 4/1991 | Schramm et al. | 208/391 |
| 5,019,245 | 5/1991 | Ignasiak et al. | 209/166 |
| 5,083,613 | 1/1992 | Gregoli et al. | 252/8.554 |

INVOLUTED FEED

TANGENTIAL FEED

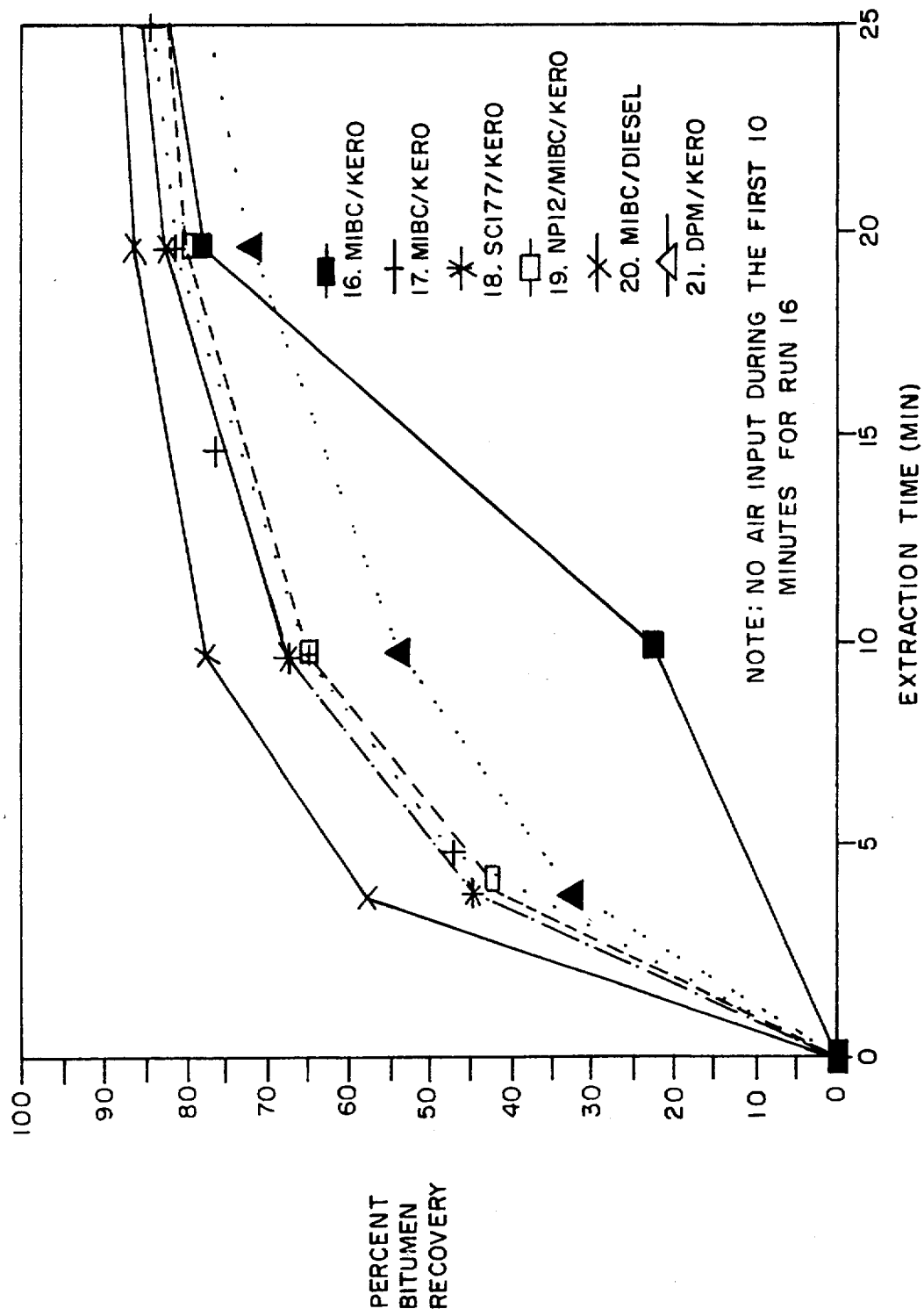

PROCESS FOR RECOVERY OF HYDROCARBONS AND REJECTION OF SAND

This is a continuation-in-part application of copending application entitled "A Process for Producing Bitumen" having Ser. No. 07/341,772 filed Apr. 21, 1989 (now U.S. Pat. No. 5,083,613), which copending application is a continuation application of application entitled "A Process for Preparing a Coal-in-Aqueous Phase Mixture" having Ser. No. 311 133, filed Feb. 14, 1989 (now abandoned), which application with Ser. No. 311,133 being a continuation-in-part application of application entitled "Surfactant Requirements for the Low-Shear Formation of Water Continuous Emulsions from Heavy Crude Oil" having Ser. No. 218,840, filed Jul. 14, 1988 (now U.S. Pat. No. 5,000,872). The application having Ser. No. 218,840, filed Jul. 14, 1988, is a continuation-in-part application of application entitled "Preparation of Improved Stable Crude Oil Transport Emulsions" having Ser. No. 114,204, filed Oct. 17, 1987 (now U.S. Pat. No. 4,978,365). The application having Ser. No. 114,204, filed Oct. 27, 1987, is a continuation-in-part application of application Ser. No. 934,683, filed Nov. 24, 1986, now U.S. Pat. No. 4,725,287. Benefit of the earliest filing date is claimed with respect to all common subject matter. All of the immediate foregoing applications and patents are fully incorporated herein by reference thereto as if repeated verbatim immediately hereafter.

FIELD OF THE INVENTION present invention is related to the recovery of hydrocarbon or bitumen from tar sands. More particularly, the present invention provides a process for recovery of hydrocarbon or bitumen from tar sands as a concentrated bitumen stream (i.e. about 10% by wt. bitumen with the remaining portion being predominately water) and the rejection of sand from the tar sands. The present invention further provides for the production of hydrocarbon or bitumen from tar sands at the mining location and for the disposal of the recovered sand also at the mining location.

BACKGROUND OF THE INVENTION

Tar sands, which are also known as oil and bituminous sands, are siliceous materials which are primarily silica (e.g., sand grains) having closely associated therewith an oil film. Tar sands generally comprise from about 5 to 21 percent by weight of an oil film; from about 70 to about 90 percent by weight of mineral solids; and from about 1 to about 10 percent by weight of an aqueous phase (i.e., water). The oil is very viscous, having an API gravity of about 1 to about 10 API degrees gravity, and typically comprises from about 1.0 to about 10.0 percent by weight inorganic elements (e.g., sulfur) and from about 30.0 to about 50.0 percent by weight cyclic hydrocarbons such as aromatics. The term "solids" is used herein to describe material of inorganic origin such as sand, clay and the like, as distinguished from materials of organic origin such as coke. The major portion, by weight, of the mineral solids in tar sands is quartz sand having a particle size greater than about 40 microns and less than about 2000 microns. The remaining mineral solid material found in tar sands has a particle size of less than about 40 microns and has been generally referred to as "fines". Fines comprise clay and silt including some very small particles of sand. Clay is a hydrated aluminum silicate with a generalized formula $Al_2O_3SiO_2.xH_2O$. More specifically, it has properties of fine, irregularly shaped crystals and depending on the iron oxide content, it has a specific gravity of from about 2.3 to about 2.7. Types of clay are kaolinite, montmorrillonite, illite, bentonite, attapulgite, and halloysite. The fines content will vary from about 5 percent to about 35 percent by weight of the total mineral solid content of tar sands. It is to be understood and is not uncommon for the ingredients of tar sands to vary from the stated proportions and concentrations.

Canada has the potential to be self-sufficient in petroleum and could be in a very enviable position. To attain self sufficiency with her energy requirements increasing and conventional petroleum reserves decreasing annually, development of energy sources, such as the oil or tar sands, becomes essential. Major impediments to current development of conventional oil sands plants are the large capital investment requirement estimated to range from $35,000 to $45,000 per daily barrel of plant capacity and the concomitant operating costs associated with mining, extraction and upgrading of bitumen to saleable synthetic crude or transportation fuels. Equally important in the production of synthetic crude oil from oil sand by conventional first generation extraction technology is the large quantity of waste water and sludge produced which are likely to be unacceptable in future plants. For example, in the first 10 years of operation at a well known facility, the volume of waste water containment which stores process affected water, waste, process chemicals and sludge grew to about $215 \times 10^6 \, m^3$ and covers an area of 22 $km^2$. (see "Development of the Tailings Pond at Syncrude's Oil Sands Plant; 1978–1987," M. D. MacKinnon, *AOSTRA Journal of Research*, 5 (1989) pg. 109.) Future liabilities related to environmental issues and specifically waste water containment may also adversely affect future participation by industry.

The largest and most important deposits of tar sands are the Athabasca tar sands, found along the banks of the Athabasca River in the Province of Alberta, Canada. Total recoverable reserves from the Athabasca tar sands, after extraction and processing, have been estimated at more than about 300 billion barrels. Athabasca tar sands comprises sand grains which are each sheathed in a thin layer of aqueous phase (i.e. water). Bitumen is trapped in the void space between the water-wet grains. The composition of Athabasca tar sands may typically comprise from about 5 to about 15 percent by weight bitumen, from about 1.0 to about 10.0 percent by weight water, and from about 80.0 to about 90.0 percent by weight of solids (as defined above). While the present invention will be described with reference to Athabasca tar sands as a feed stock, it is to be understood that the spirit and scope of the present invention includes any hydrocarbon bearing sand as feed stock.

Presently known commercial arrangements include the existing Syncrude and Suncor operations in Alberta, Canada. Both operations employ dry mining of tar sands, which broadly comprises transportation of this material to extraction plants located distally, separation of a large sand fraction from the tar sands, and slurry transportation of the reject sand-clay-silt stream to a distal tailings pond. A simplified flow process of the Syncrude operations broadly involves mining, tar sands transportation, followed by primary separation which incorporates tumblers, thickeners and flotation vessels.

The tailings are slurried back to an ever-increasing pond due to the physical and chemical characteristics of the sands and sludge.

Athabasca tar sands are presently and more specifically processed using a method which is commonly referred to as the "hot water" method. In accordance with the "hot water" process for primary extraction of bitumen from tar sands, tar sand is mixed in a conditioning drum or tumbler with hot water and steam. Sodium hydroxide or other reagents are added as required to maintain and control the pH in the range of from about 8.0 to about 8.5. While in the tumbler, the tar sands disintegrates and liberates bitumen, and simultaneously, liberated bitumen is aerated. By "disintegrate" is meant that the bitumen particles and particulate sand are dispersed or separated from each other in a preliminary manner or fashion. Stated alternatively, during slurrying bitumen films are ruptured and a preliminary separation of the sand grains and bitumen droplets takes place. Simultaneously, air bubbles are entrained in the slurry. The tumbler produces a pulp or slurry having the consistency of porridge or leek soup or broth, and comprising from about 5.0 to about 15.0 percent by weight bitumen, from about 15.0 to about 30.0 percent by weight water, and from about 60.0 to about 80.0 percent solids (as defined above), at a temperature of 180°–195° F.

The produced conditioned pulp or slurry leaves the tumbler and is then diluted with additional hot water to further disperse the sand and bitumen. This dilution operation is usually carried out at a screen positioned at the outlet from the tumbler. The diluted or flooded slurry typically has a composition comprising 2 to 10 wt. percent bitumen, 40 to 50 wt. percent water, and 45 to 55 wt. percent solids ( as defined above).

The diluted or flooded slurry is subsequently introduced into a separator cell in proximity to its longitudinal point. The separator cell is typically a cylindrical vessel having a conical bottom. The contents of the separator cell are commonly maintained at about 75° to 85° C. In the separator cell the bitumen particles, which have been attached to air bubbles, tend to rise to the surface of the water body and form a coherent mass known as an oily primary froth which for further treatment is recovered in a launder running around the rim of the cell. The major portion of the solids, particularly the coarse sand particles, tend to sink to the bottom of the cell and are withdrawn or drawn off as tailings.

A middlings stream comprising water, fine solids (e.g., clay) and some oil or bitumen, is continuously withdrawn from the separator cell at a point intermediate to the upper and lower ends of the separator cell. This middling stream typically comprises from about 1 to about 4 percent by weight bitumen, from about 10 to about 20 percent by weight mineral solids, and from about 75 to about 90 percent by weight aqueous phase or water. This middling stream is treated in a sub-aerated flotation cell to recover the contained bitumen in the form of secondary froth. The secondary froth is badly contaminated with mineral solids and water and may typically comprise 12 to 20 percent by weight solids, 50 to 60 percent by weight aqueous phase (or water) and 25 to 37 percent by weight bitumen. Once the bitumen has been extracted from the tar sand in this fashion, the primary and secondary froths are combined, diluted with a specific gravity-altering diluent (such as naphtha or any other suitable agent) and treated in a centrifuge circuit to separate the solids or residual minerals and water from the bitumen. The specific gravity-altering diluent (i.e., naphtha) may be distilled for further processing. The following patents broadly teach or suggest an apparatus and/or method for removing bitumen from tar sands, with some of the following patents more specifically teaching the caustic "hot water" process: U.S. Pat. Nos. 3,068,167 to White; 3,297,568 to McMahon; 3,392,105 to Poettmann et al; 3,696,923 to Miller; 3,864,251 to Cymbalisty; 3,869,384 to Schutte; 4,018,664 to Bain et al; 4,229,281 to Alquist et al; 4,340,487 to Lynn; 4,368,111 to Siefkin et al; 4,392,941 to Roth et al; 4,514,305 to Filby; 4,891,131 to Sadeghi et al; 4,913,805 to Chin; 4,946,597 to Sury; 4,968,412 to Guymon; 5,009,773 to Schramm et al; 5,019,245 to Ignasiak et al; 4,036,732 to Irani et al; 4,071,434 to Gifford; 4,110,194 to Peterson et al; 4,347,118 to Funk et al; 4,383,914 to Kizior; 4,399,039 to Yong; 4,424,112 to Rendall; 4,676,889 to Hsieh et al; 4,702,487 to Stoian et al; 4,719,008 to Sparks et al; 4,776,949 to Leung et al; and 4,929,341 to Thirumalachar et al. All of these U.S. Patents will be fully incorporated herein by reference thereto as if fully repeated verbatim immediately hereafter.

Conventional extraction processes result in a significant quantity of organic and inorganic sludges remaining with the reject tailings. This strongly bound (toluene insoluble) organic matter modifies the hydrophilic character of certain oil sand solids resulting in serious problems in processing oil or tar sands in conventional hot water extraction processes. ("Properties of Fines Size Fractions in Relation to the Distribution of Humic-Inorganic Matter Complexes in Athabasca Oil Sands," L. S. Kotlyar and B. D. Sparks, *AOSTRA Journal of Research*, 4 (1988) pg. 277.) These compounds also complicate the operation of the tailings pond by remaining in suspension as "globules." It has been reported that one half of the silt and clay and almost all the bitumen remains in suspension and flows to the center of the pond to form a sludge containing up to 85 to 90% process water.

Speight and Moschopedis presented results of studies addressing clays remaining in pond water in the form of a colloidal dispersion which adversely affects the volume of water available from the pond for recycle. Variation of pH causes a change in the charge on the surfaces of clay particles, thus effecting flocculation. (see "Factors Affecting Bitumen Recovery by the Hot Water Process," J. G. Speight and S. E. Moschopedis, Alberta Research Council, 1978.) They further conclude that the disposal of tailings from the hot water extraction process represents one of the major problems facing commercial development. While surface active materials present in the bitumen appear to have a beneficial effect on bitumen recovery, their ability to act as clay dispersants has an adverse effect on the settling of the clays in the tailings pond. (see "Surface and Interfacial Phenomena Related to the Hot Water Processing of Athabasca Oil Sands," J. G. Special and S. E. Moschopedis, Alberta Research Council, Information Series 86, 1980).

Bowman and Co-workers (J. Leja and C. W. Bowman, "Application of Thermodynamics to the Athabasca Tar Sands", Can. J. Chem. Eng., A6 (1968) pg. 479) established that the surface active agents in the process are primarily water soluble salts of naphthenic acids having carboxylic functional groups. Furthermore, they observed that the surfactants interact with mineral surfaces and play a role in solids flotation.

Sanford and Co-workers concluded that the role of sodium hydroxide in the hot water extraction process is primarily that of a generator of natural surfactants which in some way aid oil separation and/or flotation. A further finding and of equal importance was the relation between the fines level and the caustic needed for oil recovery. Furthermore, very lean grades of oil sands may not be able to supply enough surfactant, adversely affecting bitumen recovery. (L. L. Schramm, R. G. Smith J. A. Stone *AOSTRA Journal of Research*, Vol. 1, 1984; page 10).

Schramm and Smith conducted extensive testing to determine the adverse affects that aging of tar sands had on bitumen recovery. They concluded that the aging mechanism is traced to changes in natural surfactant concentrations generated during processing. In essence they found that the aging effect can be traced to reactions that effectively reduce the concentration of natural carboxylate surfactant produced in the hot water separation process. ("Some Observations on the Aging Phenomenon in the Hot Water Processing of Athabasca Oil Sands, Part 2, The Mechanism of Aging," L. L. Schramm and R. G Smith, *AOSTRA Journal of Research* Vol. 3 (1987) pg. 215).

Kotlyar, Sparks and Kodama concluded that serious problems which occur during bitumen extraction by the hot water process could be due to the fact that the hydrophilic (water loving) character of some of the solids is modified by the presence of tightly bound organic (humic) matter. This material cannot be removed by extraction with good solvents commonly used for bitumen such as toluene or dichloromethane. Most of the humic matter in oil sands is known to be associated with fines i.e., that fraction of oil sands solids with a particle size below 38 microns. (see "Isolation and Characterization of Organic-Rich Solids Present in Athabasca Tailings Pond Sludge", L. S. Kotlyar, B. D. Sparks and H. Kodaman, *AOSTRA Journal of Research*, Vol. 6 (1990) pg. 41).

M. D. MacKinnon addresses the development of the tailings pond at the Syncrude plant between 1978 and 1987. He indicates that about 70% of the plant water requirements are reclaimed from the free water zone and that 1 m$^3$ of water per ton of oil sand is recycled from the pond. An additional requirement of 0.3 m$^3$ per ton of oil sand is withdrawn from the Athabasca River. Extensive information on the physical and chemical properties of the pond is presented. (M. D. MacKinnon, *AOSTRA Journal of Research*, Vol. 5 (1989) pg. 109–131.) Other organizations have also investigated alternative technologies for the surface minable resource with a view to reducing the cost of recovering bitumen from oil sands as well as minimizing some of the problems noted.

As specifically stated in U.S. Pat. No. 4,392,941 to Roth et al, the tailings that are collected from recovering bitumen from tar sands, generally will contain solids as well as dissolved chemicals. The tailings are usually collected in a retention pond where additional separation occurs. As is well known, retention ponds involve large space requirements and the construction of expensive enclosure dikes. The tailings can also be considered as processing waste water containing solids which are discharged from the extraction process. The tailings comprise waste water, both the natural occurring water and added water, bitumen and mineral. As stated in U.S. Pat. No. 4,018,664 to Bain et al, because this waste water contains oil emulsions, finely dispersed clay with poor settling characteristics and other contaminants, water pollution considerations prohibit discarding the effluent into rivers, lakes or other natural bodies of water. The disposal of the waste water streams has therefore presented a problem. A portion of the water in the waste water stream can be recycled back into the hot water extraction process as an economic measure to conserve both heat and water. However, experience has shown that the dispersed silt and clay content of the recycled water can reduce primary froth yield by increasing the viscosity of the middlings layer and retarding the upward velocity of oil droplets. When this occurs, the smaller oil droplets, and those that are more heavily laden with mineral matter stay suspended in the water of the separation cell and are removed from the cell with the middlings layer.

The mineral particle size distribution is particularly significant to operation of the hot water process and to sludge accumulation. The terms "sand", "silt" and "clay" are used in this specification as particle size designations. Sand is siliceous material which will not pass through a 325 mesh screen. Silt will pass through a 325 mesh screen but is generally smaller than 45 microns and larger than two microns and can contain siliceous material. Clay is smaller than 2 microns and also can contain siliceous material. The word "fines" as used herein refers to a combination of silt and clay.

As previously indicated and as specifically stated in U.S. Pat. No. 4,392,941 to Roth et al, conditioning tar sands for the recovery of bitumen consists of heating the tar sand/water mixture to process temperature (180°–200° F.), physical mixing of the pulp to uniform composition and consistency, and the consumption (by chemical reaction) of the caustic (i.e., NaOH) or other added reagents. Under these conditions as Roth et al points out in U.S. Pat. No. 4,392,941, bitumen is stripped from the individual sand grains and mixed into pulp in the form of discrete droplets of a particle size on the same order as that of the sand grains. During conditioning, a large fraction of the clay particles becomes well dispersed and mixed throughout the pulp. The conditioning process which prepares bitumen for efficient recovery during the following process steps also prepares the clays to be the most difficult to deal with in the tailings disposal operation.

As further previously indicated and as specifically stated by Roth et al in U.S. Pat. No. 4,392,941, the other process step, termed "separation", is actually the bitumen recovery step because the separation has already occurred during conditioning. The conditioned tar sand pulp is screened to remove rocks and unconditionable lumps of tar sands and clay. The reject material, termed "screen oversize" is discarded The screened pulp is further diluted or flooded with water to promote the following two settling processes: globules of bitumen, essentially mineral-free, float upward to form a coherent mass of froth on the surface of the separation units; and, at the same time, mineral particles, particularly the sand size material, settle down and are removed from the bottom of the separation unit as sand tailings. These two settling processes take place through a medium called the middlings. The middlings consists primarily of water, bitumen particles and suspended fines which includes silt and clay.

Roth et al in U.S. Pat. No. 4,392,941 has stated that the particular sizes and densities of the sand and of the bitumen particles are relatively fixed. The parameter which influences the settling processes most is the viscosity of the middlings. Characteristically, as the suspended material content rises above a certain threshold, which varies according to the composition of the suspended fines, viscosity rapidly achieves high values with the effect that the settling processes essentially stop. Little or no bitumen is recovered and all streams exiting the unit have about the same composition as the feed. As the feed suspended fines content increases, more water must be used in the process to maintain middlings viscosity within the operable range.

The third step of the hot water process is scavenging. The feed suspended fine content sets the process water requirement through the need to control middlings viscosity which, as noted before and as indicated by Roth et al in U.S. Pat. No. 4,392,941, is governed by the clay/water ratio. It is usually necessary to withdraw a stream of middlings to maintain the separation unit material balance, and this stream of middlings can be scavenged for recovery of incremental amounts of bitumen. Air flotation is an effective scavenging method for this middlings stream.

As is well known in the art, final extraction or froth clean-up is usually accomplished by centrifugation. Froth from primary extraction is diluted with naphtha, and the diluted froth is then subjected to a two stage centrifugation. This process yields an oil product of essentially pure, but diluted, bitumen. Water and mineral and any unrecovered bitumen removed from the froth constitutes an additional tailing stream which must be disposed.

Tailings are a throwaway material generated or obtained in the course of extracting the valuable material (i.e. bitumen) from the non-valuable material (e.g. sand, sludge, etc.) And in tar sands processing, tailings consist of the whole tar sand plus net additions of process water less only the recovered bitumen product. Roth et al in U.S. Pat. No. 4,392,941 has subdivided tar sand tailings into the following three categories: (1) screen oversize; (2) sand tailings—the fraction that settles rapidly, and (3) middlings—the fraction that settles slowly. Screen oversize is typically collected and handled as a separate stream.

Tailings disposal is the operation required to place the tailings in a final resting place. As previously indicated, because the tailings contain bitumen or oil emulsions which may be defined as finely dispersed clay with poor settling characteristics and other contaminants, water pollution considerations prohibit discarding the tailings into rivers, lakes or other natural bodies. As previously mentioned, currently the tailings are stored in retention ponds (also referred to as evaporation ponds) which involve large space requirements and the construction of expensive enclosure dikes. As further previously mentioned, a portion of the water in the tailings can be recycled back into the water extraction process as an economic measure to conserve water. Roth et al in U.S. Pat. No. 4,392,941 has indicated that the following are two main operating modes for tailings disposal: (1) dike building—hydraulic conveying of tailings followed by mechanical compaction of the sand tailings fraction; and (2) overboarding—hydraulic transport with no mechanical compaction.

For dike building at a well known commercial location, tailings are conveyed hydraulically to the disposal area and discharged onto the top of a sand dike which is constructed to serve as an impoundment for a pool of liquid contained inside. On the dike, sand settles rapidly and a slurry of water, silt, clay and minor amount of bitumen, as well as any chemical used during processing flows into the pond interior. The settled sand is mechanically compacted to build the dike to a higher level. The slurry which drains into the pond interior commences stratification in settling over a time scale of months to years. As a result of this long term settling, Roth et al in U.S. Pat. No. 4,392,941 has stated that three layers form. The top layer, e.g. 5–10 feet of the pool, is a layer of relatively clear water containing minor amounts of solid, e.g. up to 5 wt. percent and any dissolved chemicals. This layer of pond water can be recycled to the water extraction process without interfering with extraction of bitumen from tar sands. As previously indicated, recycling pond water serves to reduce the overall volume increase of water stored in retention pond. Below this clear top water layer is a discontinuity in solid contents. Over a few feet, solids content increases to about 10–15 wt. percent and thereafter, sol ida contents increase regularly toward the pond bottom. In the deeper parts of the pond, solid contents of over 50 wt. percent have been measured. This second layer is commonly called the sludge layer. In general the sludge layer can be characterized as having more than 10 wt. percent solids (which may also be defined as mineral plus bitumen). More particularly as Roth et al has stated in U.S. Pat. No. 4,392,941, the sludge can be characterized as having 20 wt. percent to 50 wt. percent solids or mineral matter comprising substantially clay and silt. Also the sludge can be characterized as having about 0.5 to about 25 wt. percent bitumen. The solids contents of the sludge layer increase regularly from top to bottom by a factor of about 4–5. Portions of the solids are clays. The clays, dispersed by the processing, apparently have partially reflocculated into a fragile gel network. Through this gel, particles of larger-than-clay sizes are slowly settling. Generally this sludge layer cannot be recycled to the separation step because no additional bitumen is extracted. More specifically, sludge is not suitable for recycling to the hot water extraction process for the reason that its addition into the separation cell or the scavenger cell at the normal inlet means would raise the mineral content of the middlings of the cell to the extent that recovery of bitumen would be substantially reduced. Generally, the settling which does take place in the pond provides a body of water in which the concentration of mineral matter increases substantially from the surface of the pond to the bottom thereof. A third layer formed of sand also exists.

Roth et al has defined in U.S. Pat. No. 4,392,941 "overboarding" as the operation in which tailings are discharged over the top of the sand dike directly into the liquid pool. A rapid and slow settling process occurs but this distinction is not as acute as in the previously mentioned dike building and no mechanical compaction is carried out. The sand portion of the tailings settles rapidly to form a gently sloping beach, extending from the discharge point toward the pond interior. As the sand settles, a slurry drains into the pool and commences long-term settling. Thus water in ponds prepared by both dike building and overboarding can be included in the general definition of sludge in the present description.

As stated in U.S. Pat. No. 4,018,664 to Bain et al, experience has shown that, as the pond forms, the various components in the effluent discharge settle in the pond at varying rates. As an example, when the waste water containing sand, silt, clay and bitumen is discharged to the pond, the free bitumen normally immediately floats to the surface of the pond and the sand immediately settles to the bottom of the pond. However, after the surface bitumen cools and releases the entrapped air which originally caused it to float, it too will begin to settle toward the bottom of the pond. The silt and clay in the discharge settle in the pond at a substantially low rate as compared to the sand.

Bain et al has characterized a pond in U.S. Pat. No. 4,018,664 as follows: it can be pictured as a large body of water containing dispersed solids which are slowly settling toward the bottom of the pond. The mineral matter in the pond is in a constant but slow state of settling. Normally, the pond is constantly increasing in size because of the continuous addition of waste water and therefore the character of the pond is continually changing.

In processing tar sands to recover bitumen therefrom, the tar sands are excavated, extracted to remove the bitumen, whereafter the sand and other minerals are returned to the excavated area. As noted above, waste waters associated with the extraction step must be stored in a retention pond which is normally placed in one of the excavated areas. It is important that the excavated area be filled only with minerals and not with water since obviously the water is excess and therefore requires more storage volume than is available. If a retention pond associated with the hot water extraction of bitumen from tar sands is not treated to remove water layers which cannot normally be reused, such as sludge, the problem of a shortage of storage space is ever present.

Bain et al has further characterized a pond in U.S. Pat. No. 4,018,664 as follows: a waste water retention pond associated with hot water process for extracting bitumen from 140,000 to 150,000 tons of tar sands per day and having a surface area of about 1,000 acres and an average depth of 40 feet can be characterized somewhat as follows:

(a) From the surface of the pond to a depth of about 15 feet the mineral concentration which is primarily clay is found to be about 0.5 to 5.0 weight percent. This pond water can normally be recycled to a hot water extraction process without interfering with the extraction of bitumen from tar sands.

(b) The layer of water in the pond between 15 and 25 feet from the surface contains between 5.0 and 20 percent mineral matter. This water, if recycled to the separation cell feed with fresh tar sands, would increase the mineral content of the middlings portion of the cell to the point that little bitumen would be recovered.

(c) Finally, the section of the pond between 25 feet and the bottom of the pond contains 20 to 50 percent mineral matter and is normally referred to as sludge.

What is needed and what has been discovered by us is a process for the recovery of hydrocarbon or bitumen from tar sands. More specifically, what is needed and what has been invented by us is a process for the recovery of hydrocarbon or bitumen from tar sands and the rejection of recovered sand from the tar sands, all at the mining site. The recovered hydrocarbon or bitumen may be upgraded by sending the same to an upgrading unit.

SUMMARY OF THE INVENTION

The present invention broadly accomplishes its desired objects by broadly providing a process for the extraction and recovery of a hydrocarbon from water wet tar sands comprising:

(a) introducing a water wet tar sand and water into a conditioning zone to form a tar sand slurry;

(b) agitating the formed tar sand slurry of step (a) to form an agitated tar sand slurry;

(c) separating the formed agitated tar sand slurry to form an aerated tar sand slurry comprising water, hydrocarbon and solids;

(d) separating in less than about five seconds essentially all of the solids from the hydrocarbon and water of the aerated tar sand slurry to produce a hydrocarbon and water mixture, and depositing said solids at the mine site; and (e) separating essentially all of the hydrocarbon from the hydrocarbon and water mixture of step (d).

The present invention further broadly accomplishes its desired objects by further broadly providing a process for recovering a hydrocarbon from a hydrocarbon bearing sand comprising the steps of:

(a) mixing a chemical additive (e.g. kerosene and/or diesel) with a chemical composition and with a hydrocarbon bearing sand containing hydrocarbon and residual solids including clay, at a temperature to form a slurry, wherein said chemical composition comprises an aqueous phase and a minor amount of a chemical agent selected from the group consisting of at least one ethoxylated alkylphenol compound, at least one ethoxylated dialkylphenol compound, MIBC, SC-177, Petronate HL, calcium lignosulfonate, and mixtures thereof;

(b) aerating the formed slurry of step (a) to produce essentially sludge-free tailings and a mixture of hydrocarbon, aqueous phase and residual solids including clay;

(c) separating said mixture of said hydrocarbon, said aqueous phase and said residual solids including clay from the essentially sludge-free tailings.

In another embodiment, the present invention yet further broadly accomplishes its desired objects by yet further broadly providing a process for recovering bitumen from tar sands comprising the steps of:

(a) mixing a chemical additive (e.g. kerosene and/or diesel) with a chemical agent and with an aqueous phase with tar sands containing bitumen and residual solids including clay, at a temperature to form a slurry, wherein said chemical agent is selected from the group consisting of at least one ethoxylated alkylphenol compound, at least one ethoxylated dialkyphenol compound, MIBC, SC-177, Petronate HL, calcium lignosulfonate, and mixtures thereof;

(b) pumping the formed slurry of step (a) towards at least one mixer;

(c) aerating the pumped slurry of step (b) to assist in the production of esentially sludge-free tailings and a mixture of bitumen, aqueous phase and residual solids including clay;

(d) agitating the aerated slurry of step (c) with said at least one mixer to further assist in the production of essentially sludge-free tailings and said mixture of bitumen, aqueous phase and residual solids including clay;

(e) separating said mixture of said bitumen and said aqueous phase and said residual solids including clay from the agitated slurry of step (d) to produce essentially sludge-free tailings; and (f) separating said aqueous phase and said residual solids including clay from said step (e) mixture comprising said bitumen, said residual solids including clay, and said aqueous phase to produce said bitumen as being essentially free of residual solids including clay.

A major objective of the present invention is to integrate sand separation and disposal close to or at the mining site, since materials transportation and processing constitute a major investment and operating cost associated with existing tar sands operations. A further objective is to minimize or eliminate costly and environmentally unacceptable tailings ponds associated with existing tar sands operations. More specifically, the technology of the present invention may employ novel surfactants in combination with cold or hot water in separating tar sands slurry into a bitumen concentrate, a water fraction and a sand fraction in a separation process unit(s) such as a hydrocyclone or similar device. The hydrocyclone separates in less than about 5 seconds the solids from the hydrocarbon and water of the aerated tar sand slurry to produce a hydrocarbon or bitumen and water mixture. All operations in the concepts of the present invention are strategically located at the mining site. Sand is rejected at the mining site avoiding the costs associated with transporting the mass to a distant extraction plant and subsequently returning the sand to a tailings pond.

The process of the present invention minimizes investment and operating costs associated with transporting large quantities of solids which comprise 80-90 percent of the tar sands from the mining site to the extraction plant and back to a tailings disposal pond. This is accomplished by dry or hydraulic mining of tar sands, combining required water and surfactant(s), mixing in a tumbler or suitable substitute, and sending the total mix to a separation device such as a hydrocyclone. All operations are strategically located at the mining site. A slurry concentrated solids stream is recycled back to an integrated mining-tailings pond wherein the sand is compacted and water is reused, if required in the process. The entire operation is located and integrated the at the mine site using conventional mining technology, i.e., hydraulic or dry, with a slurry conditioning step in piping or mixers followed by solids-bitumen separation for rejecting a major portion of the sand fraction in the slurry and depositing it at the mine site. Equipment employed for the latter could involve hydrocyclones, froth flotation, etc. The major component is the use of novel surfactants or other claimed substitutes to effect the desired water-sand-bitumen concentrate separation. It is yet another objective to have the toluene insoluble organic sludges remain with the concentrated bitumen stream to be processed in downstream equipment for bitumen recovery as well as additional solids separation. The tailings stream will be free of this strongly bound (toluene insoluble) organic matter in order to improve sand separation and compaction.

The concept of sand rejection at the excavation/production site eliminates the need for transporting large quantities of materials commonly employed in commercial processes. The use of novel surfactants in combination with cold or hot water or brine is effective in separating water wet sand from bitumen. A bitumen concentrate can be effectively separated from sand at the mining site compared to an alkaline treatment. The most significant aspect of this application in the field is separating all or part of the sand at the mine from a bitumen concentrate and leaving the bulk of sand at the mine site. By minimizing the tailings transportation which consists of sand, clays, silt, and makes up approximately 90% of the tar sands, very large materials handling investment and operating costs can be eliminated or reduced. Minimizing or eliminating conventional tailing ponds such as those employed at Syncrude and Suncor is desirable.

The results of the present invention are totally unexpected in view of the published literature, for example E. C. Sandford, Syncrude Canada Ltd. in an article titled "Processibility of Athabasca Oil Sand", Can. J. Chem. Eng., V61 (1983) pg. 554, which indicates that "non-ionic surfactants were not useful"; pg. 555 "As a general rule non-ionic emulsifiers of low HLB, such as ATPET 100, have no effect on extraction". He further shows that NP-35 results in bitumen recovery decreasing from 65% to 10% with the addition of Tergitol NP-35. Further testing conducted in a laboratory apparatus substantiates that the surfactants of the present invention (such as NP40+NP100 or, DP/DNP150) are as effective as caustic in recovering bitumen from tar sands (90+%) while producing a water clear of the suspended solids and bitumen found with caustic hot water treating. The results confirm that the substitutes to caustic of the present invention are equally effective in bitumen recovery with attendant production of clean recycled water and sands.

It is therefore an object of the present invention to provide a process for recovering hydrocarbon or bitumen from tar sands.

It is another object of the present invention to provide a process for recovering hydrocarbon or bitumen, from tar sands and for disposing of the resulting sand at the mining location.

These, together with the various ancillary objects and features which will become apparent to those skilled in the art as the following description proceeds, are attained by this novel method for removing bitumen/hydrocarbn from tar sands, a preferred embodiment as shown with reference to the accompanying drawings, by way of example only, wherein;

BRIEF DESCRIPTION OF THE DRAWINGS

FIG. 9A is a graph of bitumen extraction test results for runs 16 to 22;

DETAILED DESCRIPTION OF THE INVENTION

Figure 1:
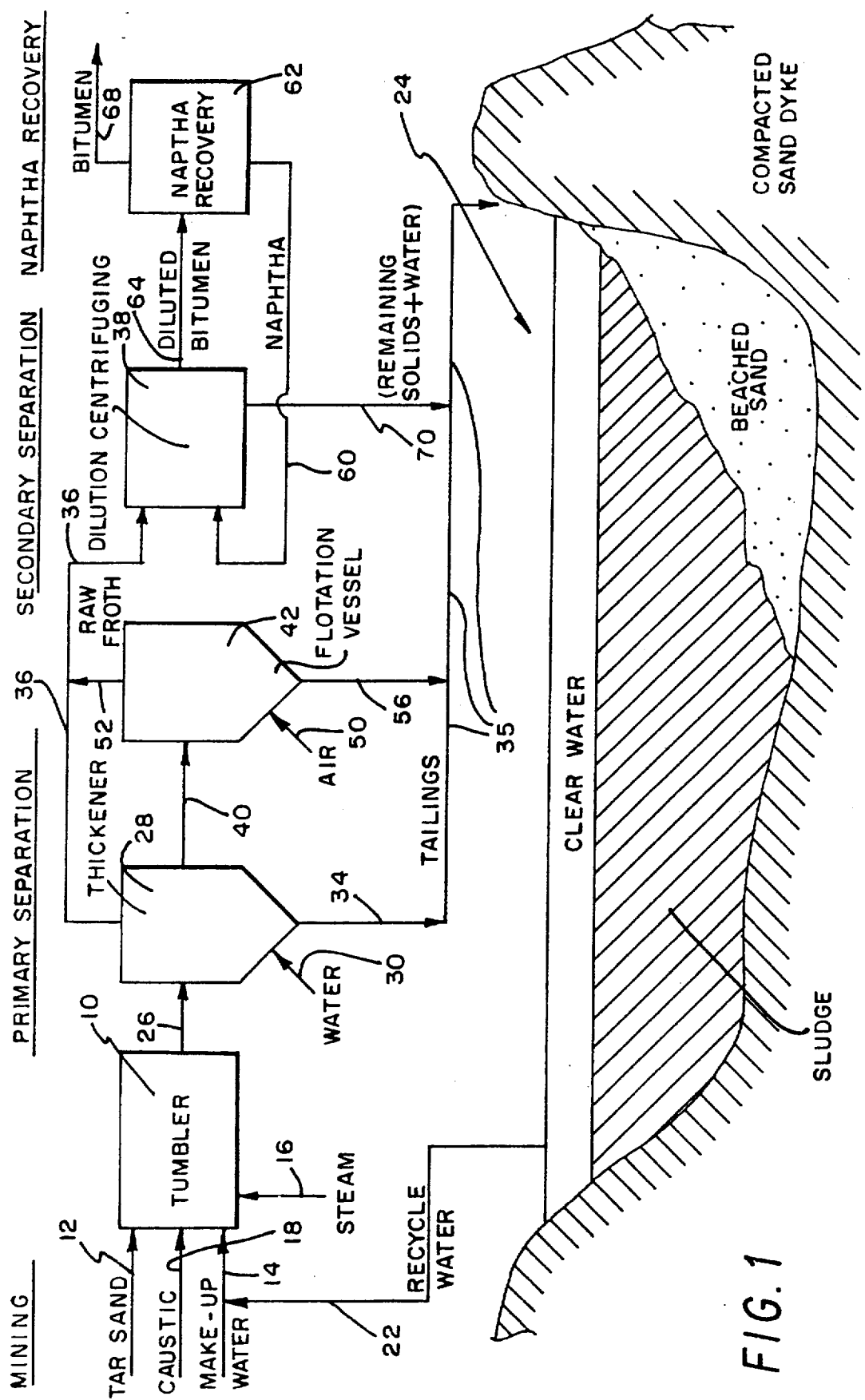
FIG. 1 is a block flow diagram of a conventional caustic hot water extraction process wherein bitumen is removed from tar sands.

Referring in detail now to the drawings, wherein similar parts of the invention are identified by like reference numerals, there is seen in FIG. 1, tar sands being fed into a conditioning drum (tumbler or muller) 10 through line 12. Water is added to the conditioning drum 10 through line 14, and steam is added to same through line 16. Water may include clear recycle water passing through line 22 from a retention pond generally illustrated as 24. The total water so introduced in liquid and vapor form is a minor amount based on the weight of the tar sands processed. More specifically, the mixture, a slurry, is about 0.3:1 water to sand by mass. Caustic (e.g., NaOH) in about 1M solution is added to the drum through line 18 to raise the pH of the slurry from about 7.0 or less to about 8.5. The temperature rises to about 80° C. in this mixing process. The water film between the bitumen and the sand grains ruptures, and small globules of bitumen froth form. The tar sands conditioned with water, steam and caustic pass through a line 26 to a thickener vessel (or primary separation tank) 28 which serves as a zone for diluting the pulp or slurry with additional hot water via line 30. The additional hot water raises the water to initial tar sands mass ratio to about 1:1. In the thickener vessel (or primary separation tank) 28 the heavy sand settles and is removed from the bottom of the thickener vessel 28 through line 34. A layer of frothy, impure bitumen rises to the surface and is skimmed off through line 36 which leads to a bitumen separator (i.e. dilution centrifuging) 38 for separating bitumen from sludge. Between about 75% and 90% of the bitumen is recovered from the tar sands in this primary froth. The settling zone within the thickener vessel 28 is relatively quiescent so that the bitumen froth can rise to the top of the slurry or pulp in the thickener vessel 28 to be removed through the line 36, while the bulk of the sand (i.e. solids) settles to the bottom of the thickener vessel 28 as a tailings layer which is withdrawn through the line 34 and introduced into line 35.

A middlings stream is withdrawn from the thickener vessel 28 via line 40 and is directed into a flotation vessel 42 where agitation and air injection help separate the remaining bitumen as a secondary froth. Stated alternatively, in the flotation vessel 42, air is introduced into the flotation vessel 42 through line 50 to conduct an air flotation operation in the flotation vessel 42 and cause the formation of additional bitumen froth which passes out of the flotation vessel 42 through a line 52, and into line 36 to be admixed with the primary bitumen froth. The combined primary and secondary bitumen froth includes remaining solids, and water, and bitumen; and the combined bitumen froth streams is sent to the bitumen separator 38 for recovering bitumen. A bitumen-lean water and sand tailings stream is removed from the bottom of the flotation vessel 42 through line 56 to be introduced into line 35 to be admixed with the tailings layer that passed through line 34.

The bitumen separator 38 is preferably a dilution centrifuging vessel which receives naphtha (i.e. solvent) from a line 60 that extends from a naphtha recovery system 62 to the bitumen separator 38. The naphtha is admixed in the bitumen separator 38 with the combined primary and secondary bitumen froth streams and assists in combination with the centrifuging vessel 38 in separating bitumen from the remaining solids and water (i.e. sludge). Diluted bitumen (i.e. naphtha plus bitumen) exits bitumen separator 38 via line 64 and is introduced into the naphtha recovery system 62 where bitumen is separated from the naphtha. Bitumen leaves naphtha recovery system 62 via line 68 for upgrading (e.g. fluid coking, fractionating, hydrotreating, etc.). Recovered naphtha is recycled back to the bitumen separator 38 to dilute the primary and secondary bitumen froth. The sludge (i.e. remaining solids and water) is removed from the bitumen separator 38 through line 70 which introduces the sludge into line 35 that-conducts the tailings layer from line 34 and the bitumen-lean water and sand tailings stream from line 56.

The tailings layer emanating through line 34, the bitumen-lean water and sand tailings stream emanating through line 56, and the sludge that is introduced into line 35 from line 70, all make up a tailing discharge stream, which can be collected and handled via a dike building or overboarding operation previously described. The tailing discharge stream is continuous and uniformly delivers into the retention pond 24.

The retention pond 24 can be considered another separation zone; it is a zone of quietness. Both the dike building and overboarding operation result in what is commonly referred to as a pond, particularly a retention pond. And as previously described, three layers are formed in the pond. They are (1) a top water layer relatively free of clay and bitumen and which can be recycled; (2) a middle layer consisting of bitumen and mineral (defined as not being soluble in toluene); and (3) a bottom layer having a relatively high concentration of sand. The middle layer is often referred to as sludge.

The sludge is continuously being formed in a time span of many months and even years. As a result, its characteristics are different than those of the middlings layer drawn off from the thickener vessel 28 via line 40.

Figure 2:
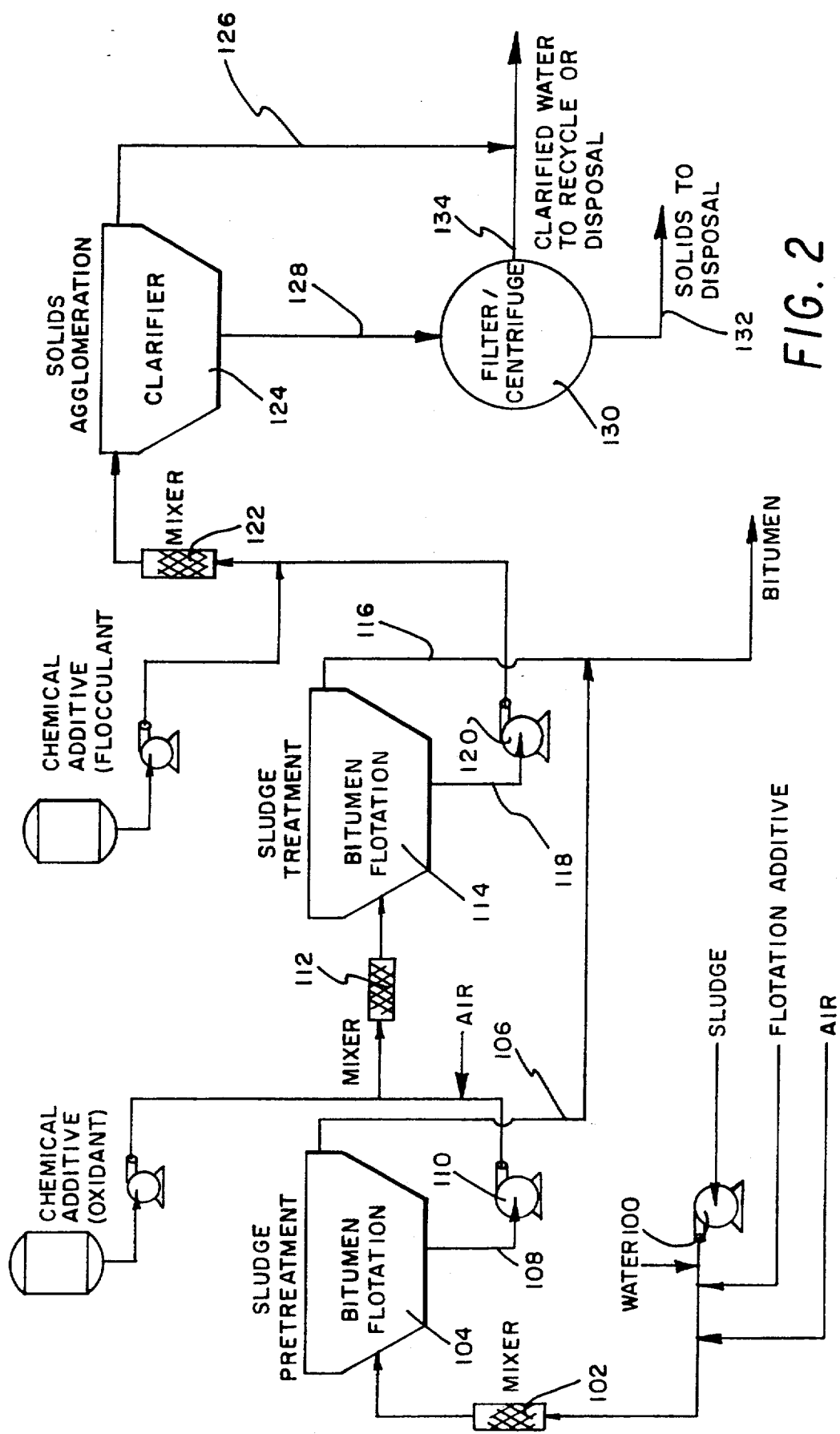
FIG. 2 is a schematic flow diagram illustrating a presently preferred embodiment for recovering bitumen from sludge.

Referring in detail now to FIG. 2 there is seen sludge recovered from retention pond 24 and being pumped by pump 100. Sludge has been previously defined, but may also be defined as comprising 5 to 40 wt. % solids, 1 to 10 wt. % bitumen, and 50 to 95 wt. % water or aqueous medium. Water or an aqueous phase is added to the sludge to dilute the same and form a water/sludge mixture or slurry. The ratio of dilution may be any suitable ratio but is preferably a weight or part ratio of water to sludge ranging from about 1:1 to about 5:1. Preferably, a flotation or chemical additive is admixed with the water/sludge slurry in a proportion such that the ratio of the parts or weight of the flotation additive to undiluted sludge ranges from about 50 to about 1,000 ppm. Stated alternatively, the flotation or additive is added to the diluted sludge at a rate of 50 to 1,000 ppm based on undiluted sludge. Preferably further, air is injected into the water/sludge slurry at a ratio varying from about 0.02 to about 0.20 lbs. air/lb. bitumen in the sludge.

The flotation or chemical additive may be selected from the group consisting of kerosene, diesel, methyl isobutyl carbinol (MIBC), petroleum sulfonate (e.g. that sold under the trademark WITCO Petronate HL), $C_6$ to $C_9$ branched aliphatic alcohols and/or ketones (such as that sold under the trademark Sherex Shurcoal-177), at least one ethoxylated alkylphenol compound, at least one ethoxylated dialkylphenol compound, and mixtures thereof.

The at least one ethoxylated alkylphenol compound is an emulsifying agent(s) (or flotation or chemical additive) selected from the ethoxylated alkylphenol compounds having a molecular weight distribution with a dispersity of from about 1.0 to about 5.0, a weight average molecular weight of from about 1966 to about 9188, and the general formula:

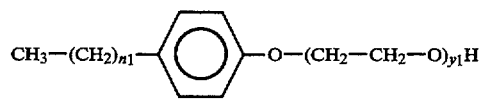

(1)

wherein $n_1$ is an integer and has a value of from about 7 to about 20, preferably 11, and $u_1$ is an integer having a value of from about 4 to about 1000; and wherein at least about 50% by weight of the emulsifying agent(s) comprises the ethoxylated alkylphenol compound having a molecular weight of from about 1966 to about 9188. The emulsifying agent(s) has at least one ethoxylated alkylphenol compound having the general formula:

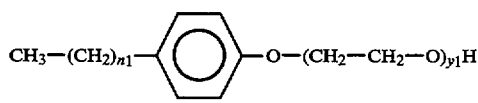

(1A)

wherein $n_1$ has a value of from about 7 to about 20, preferably 11; and $y_1$ is greater than 100, preferably greater than 100 but less than 1000, and the ethoxylated alkylphenol compound of general formula (1A) preferably comprises at least 1% by weight (more preferably from 1% to 90% by weight) of the emulsifying agent(s) or flotation/chemcial additive.

More preferably, the dispersity of the molecular weight distribution of the emulsifying agent(s) represented by general formula (1) is from about 1.0 to about 2.5, most preferably about 1.0 to 2.0. The weight average molecular weight of the emulsifying agent(s) is more preferably from about 3726 to about 6548, most preferably from about 4606 to 5668. More preferably, at least about 70% by weight (most preferably, at least about 85% by weight) of the emulsifying agent(s) comprises the ethoxylated alkylphenol compound having a molecular weight of from about 1966 to about 9188.

The at least one ethoxylated dialkylphenol compound in the present invention may be those emulsifying agent(s) (or chemical or flotation additive) selected from the ethoxylated dialkylphenol compounds having a molecular weight distribution with a dispersity of from about 1.0 to about 5.0, a weight average molecular weight of from about 2519 to about 11,627, and the general formula:

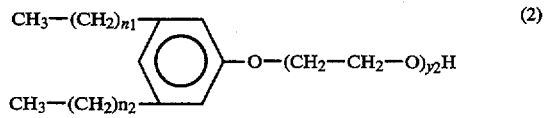

(2)

wherein $n_1$ is an integer and has a value of from about 7 to about 18, $n_2$ is an integer and has a value of from about 7 to about 18, and $y_2$ is an integer having a value of from about 4 to about 1000; and wherein at least about 50% by weight of the emulsifying agent (s) comprises the ethoxylated dialkylphenol compound having a molecular weight of from about 2519 to about 11,627. The emulsifying agent(s) has at least one ethoxylated dialkylphenol compound having the general formula:

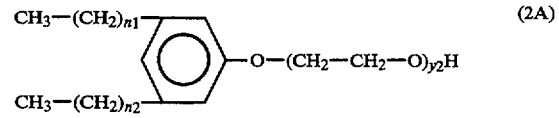

(2A)

wherein $n_1$ has a value of from about 7 to about 18, $n_2$ has a value of from about 7 to about 18, and $y_2$ is greater than 100, preferably greater than 100 but less than 1000; and the ethoxylated dialkylphenol compound of general formula (2A) preferably comprises at least 1% by weight (more preferably from 1% to 90% by weight) of the emulsifying agent(s) or flotation/chemical additive.

More preferably, the dispersity of the molecular weight distribution of the emulsifying agent(s) (or flotation or chemical additive) represented by the general formula (2) is from about 2.5, most preferably about 1.0 to 2.0. The weight average molecular weight of the emulsifying agent(s) (or flotation or chemical additive) is more preferably from about 4714 to about 8547, most preferably from about 6039 to about 7227. More preferably, at least about 70% by weight (most preferably, at least about 85% by weight) of the emulsifying agent(s) comprises the ethoxylated dialkylphenol compound having a molecular weight of from about 2519 to about 11,627.

The flotation or chemical additive or emulsifying agent(s) may be a combination of the ethoxylated alkylphenol compounds having the general formula (1) and the ethoxylated dialkylphenol compounds having the general formula (2) in any percent by weight proportion provided that the dispersity of the molecular weight distribution of the entire combination is from about 1.0 to about 5.0 (more preferably about 1.0 to about 2.5 and most preferably about 1.0 to 2.0), and the weight average molecular weight in the combination of the emulsifying agent(s) [or in general formula (1) and/or in general formula (2)] is about 1966 to about 11,627 (more preferably about 3726 to about 8547, most preferably about 4606 to about 7227). Furthermore, the entire combination should comprise at least 50% by weight (more preferably at least about 70% by weight, most preferably at least about 85% by weight) of the ethoxylated alkylphenol compound and the ethoxylated dialkyphenol compound wherein the ethoxylated alkylphenol compound has a molecular weight of from about 1966 to about 9188 and the ethoxylated dialkylphenol compound has a molecular weight of from about 2519 to about 11,627. More preferably, the compounds having the general formula (1) are from about 30% by weight to about 80% by weight of the combination. Furthermore, at least 1% by weight (preferably 1% to 90% by weight) of the combination of the ethoxylated alkylphenol compound having the general formula (1) and the ethoxylated dialkylphenol compound having the general formula (2) comprises the ethoxylated alkylphenol compound having the general formula (1A) and/or the ethoxylated dialkylphenol compound having the general formula (2A), where $y_1$ and $y_2$ are both greater than 100, preferably greater than 100 but less than 1000.

In a more preferred embodiment of the present invention the flotation or chemical additive comprises about 50 percent by weight of an ethoxylated dialkyphenol compound having the formula:

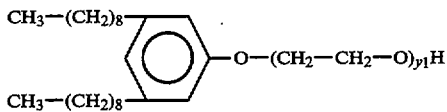

and about 50 percent by weight of an ethoxylated alkylphenol compound having the formula:

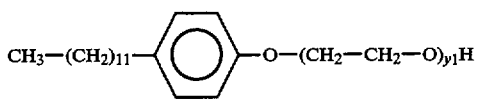

wherein $y_1$ in both formulas is equal to 150 and is the average number of ethylene oxide units in the formulas. In another more preferred embodiment of the present invention the flotation or chemical additive comprises about 50 percent by weight of an ethoxylated nonyl phenol compound having the formula:

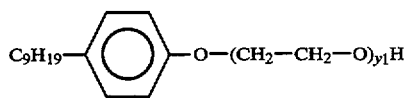

wherein $y_1$ is equal to 40 and is the average number of ethylene oxide units in the formula, and about 50 percent by weight of an ethoxylated nonyl phenol compound having the formula:

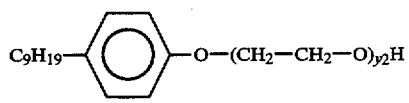

wherein $y_2$ is equal to 100 and is the average number of ethylene oxide units in the formulas.

The water/sludge/air mixture or slurry (or water/sludge/air/flotation additive mixture or slurry) is pumped by pump 100 through a mixer 102, preferably one of the static mixers as disclosed in U.S. Pat. No. 4,725,287 fully incorporated herein by reference thereto. The water/sludge/air mixture (or water/sludge/air/flotation additive mixture) is further agitated and/or mixed by passing through mixer 102 since pump 100 and aeration in themselves are agitators and/or mixers. After passing through mixer 102 the mixture or slurry is introduced into a settling zone (or flotation cell 104) or sludge pretreatment zone for a residence time which varies from about 10 minutes to about 2 hours to produce an upper bitumen-containing froth layer comprising recovered bitumen recovered from the sludge, and a lower sludge layer reduced in bitumen content.

The recovered bitumen in the upper bitumen-containing froth layer represents 20 to 40 wt. % of the bitumen in the original sludge. The lower sludge layer reduced in bitumen content is essentially the original sludge after having been reduced by 20 to 40 wt. % of its bitumen. The upper bitumen-containing froth layer leaves flotation cell 104 through line 106, and the lower sludge layer leaves flotation cell 104 through line 108 and is pumped by pump 110 towards mixer 112. Before reaching mixer 112 an oxidant is added to the lower sludge layer in an amount, quantity or proportion such that the ratio of the parts or weight of the oxidant to the lower sludge layer (or pretreated sludge) ranges from about 100 to about 20,000 ppm, preferably 1,000 ppm to 5,000 ppm. Stated alternatively, the oxidant addition ranges from about 100 to about 20,000 ppm based on the pretreated sludge. Before reaching mixer 112 the lower sludge layer is aerated with air in a ratio or proportion ranging from about 0.02 to about 0.2 lbs. air per lb. of bitumen in the lower sludge layer.

The oxidant is selected from the group consisting of sodium hypochlorite (NaClO), sodium chlorite (NaClO$_2$), sodium chlorate (NaClO$_3$), potassium permanganate (KMnO$_4$), ozone (O$_3$), chlorine (Cl$_2$), chlorine (Cl$_2$) and water (H$_2$O), hydrogen peroxide (H$_2$O$_2$), and mixtures of any of the foregoing. Preferably, the oxidant is hydrogen peroxide.

After passing through mixer 112, the agitated slurry or mixture enters into a settling zone (or flotation cell 114) or sludge treatment zone for a residence time varying from about 10 minutes to about 2 hours to produce an upper bitumen-containing froth layer comprising further recovered bitumen, further recovered from the pretreated or lower sludge layer from cell 104, and a lower sludge layer reduced in bitumen content. The further recovered bitumen in the upper bitumen-containing froth layer represents 30 to 70 wt. % of the bitumen in the pretreated sludge or the lower sludge layer leaving flotation cell 104 through line 108. The lower sludge layer produced in cell 114 and reduced in bitumen content is essentially the pretreated sludge (or lower sludge layer in line 108) after having been reduced 30 to 70 wt. % of its bitumen. The upper bitumen-containing froth layer leaves flotation cell 114 through line 116 and may be admixed with the upper bitumen containing froth layer in line 106. The lower sludge layer leaves flotation cell 114 through line 118 and is pumped by pump 120 towards mixer 122. Before reaching mixer 122 a flocculent (e.g. FeCl$_3$) is added to the lower sludge layer leaving cell 114 in line 118. The flocculent is added to the lower sludge layer (or treated sludge) in an amount, quantity or proportion such that the ratio of the parts or weight of the oxidant to the lower sludge layer (or treated sludge) ranges from about 500 to about 25,000 ppm. Stated alternatively, the flocculent addition ranges from about 500 to about 25,000 ppm based on the treated sludge.

After passing through mixer 122, the agitated slurry or mixture enters into a separator or clarifier 124 for a residence time varying from about 30 minutes to about 24 hours to produce clarified water (which exits the clarifier 124 through line 126) and a tail or solid concentrate containing water and exiting the clarifier 124 through line 128. The clarified water in line 126 represents 10 to 50 wt. % of the water in the lower sludge (or treated sludge)/flocculent mixture or slurry. The tail or solid concentrate containing water comprises 15 to 60 wt. % of the solids in the lower sludge (or treated sludge)/flocculent mixture or slurry, and is introduced into a filter/centrifuge 130 to produce additional clarified water that exits the filter/centrifuge 130 via line 134 for admixing with water in line 126 for recycling to be mixed with the sludge from retention pond 24, or for disposal. The filter/centrifuge 130 also produces solids containing 1 to 5 wt. % water and exiting the filter/centrifuge 130 via line 132 for disposal or other use.

Thus, there is provided a method for recovering bitumen in or from sludge and to dispose of tailings pond water and clays/solids sand in an environmentally acceptable manner. The process or method of the present invention is applicable to treating effluent tailings from commercial extraction plants. The recovered water can be used as recycle to minimize fresh water make-up. A secondary purpose is to eliminate the environmentally unacceptable tailings ponds.

Current technology practiced at Syncrude and Suncor in Alberta, Canada produces large quantities of sludge. Typical analysis of Suncor sludge and particle size distribution of clays-sand are as follows:

| Suncor Tailings Pond | Sludge Pond #1 | Sludge Pond #2 |
|---|---|---|
| % $H_2O$ | 54.9 | 62.7 |
| % Bitumen | 5.6 | 7.6 |
| % Solids | 39.4 | 29.7 |
| % < 22 microns | 76.7 | 64.5 |
| % < 11 microns | 57 | 44.7 |

The sludge from Pond 1 has physical characteristics which are similar to mayonnaise in consistency. Treating the sludge with known agents such as HCl to finalize a pH of 1.5 to 2 had little beneficial effect on physical properties.

The disadvantages of the current commercial processes are two fold, i.e. loss of bitumen and production of tailings contributing to an ever increasing tailings pond which cannot be abandoned. There are no known commercial processes which recover the bitumen and dispose of the liquid and solids in an acceptable manner.

The two stage process utilizes an oxidizing agent in the 1st stage which has proven to be effective in conditioning the sludge, i.e. in breaking the stable colloidal suspension by reacting with a sludge component, and floating the bitumen (formerly complexed with clays) to the surface. Hydrogen peroxide (applied at a rate of approximately 1% of sludge volume) was found to be effective in recovering bitumen from sludge samples of Suncor's Sludge Pond #1 while simultaneously producing a clean clay-sand reject. The second stage of the process includes the addition of a flocculent such as $FeCl_3$ which produces a clear liquid and essentially dry solids for disposal using conventional technology.

In another embodiment of the present invention, there is provided a process for recovering a hydrocarbon from a hydrocarbon bearing sand. More specifically there is provided a process for recovering bitumen from tar sands. As previously mentioned, the following U. S. Patents teach an apparatus and/or method for removing a hydrocarbon or the like from hydrocarbon bearing particulate matter or the like: U.S. Pat. Nos. 3,068,167 to White; 3,297,568 to McMahon; 3,392,105 to Poettmann et al; 3,696,923 to Miller; 3,864,251 to Cymbalisty; 3,869,384 to Schutte; 4,018,664 to Bain et al; 4,229,281 to Alquist et al; 4,340,487 to Lyon; 4,368,111 to Siefkin et al; 4,392,941 to Roth et al; 4,514,305 to Filby; 4,891,131 to Sadeghi et al; 4,913,805 to Chin; 4,946,597 to Sury; 4,968,412 to Guymon; 5,009,773 to Schramm et al; 5,019,245 to Ignasiak et al; 4,036,732 to Irani et al; 4,071,434 to Gifford; 4,110,194 to Peterson et al; 4,347,118 to Funk et al; 4,383,914 to Kizior; 4,399,039 to Yong; 4,424,112 to Rendall; 4,676,889 to Hsieh et al; 4,702,487 to Stoian et al; 4,719,008 to Sparks et al; 4,776,949 to Leung et al; and 4,929,341 to Thirumalachar et al. All of these U.S. Patents will be fully incorporated herein by reference thereto as if fully repeated verbatim immediately hereafter.

In this other preferred embodiment of the present invention, a hydrocarbon bearing sand, preferably an Athabasca tar sand from the Athabasca deposit at Fort McMurray, Alberta, Canada, is mixed with or otherwise co-mingled with an aqueous medium or phase, agitated to form a slurry, and then introduced directly into an enhanced gravity separator. Athabasca tar sands are water wet tar sands, as opposed to oil wet tar sands as taught in U.S. Pat. No. 4,368,111 to Siefkin et al, and typically have a pH of between about 6.0 and about 7.0 (or less than 7.0). The aqueous medium or phase and tar sand mixture or slurry preferably has a temperature between about 75° F. and 200° F. The agitated Athabasca tar sand and water mixture or slurry is introduced directly into an enhanced separator without being admixed with any pH controlling agents, such as NaOH. Stated alternatively, no caustic agents are to be added to raise the pH of the slurry from 7.0 to 8.5. In a conventional "hot water" extraction process, NaOH is added to the slurry to elevate the pH, and the sodium ion from NaOH in combination with other tar sands constituents causes the formation of sludge. The agitated Athabasca tar sand and water slurry is introduced directly into an enhanced separator without passing into any separator such as a thickener vessel and/or flotation vessel, or into any other container or vessel for any suitable purpose.

Figure 3A:
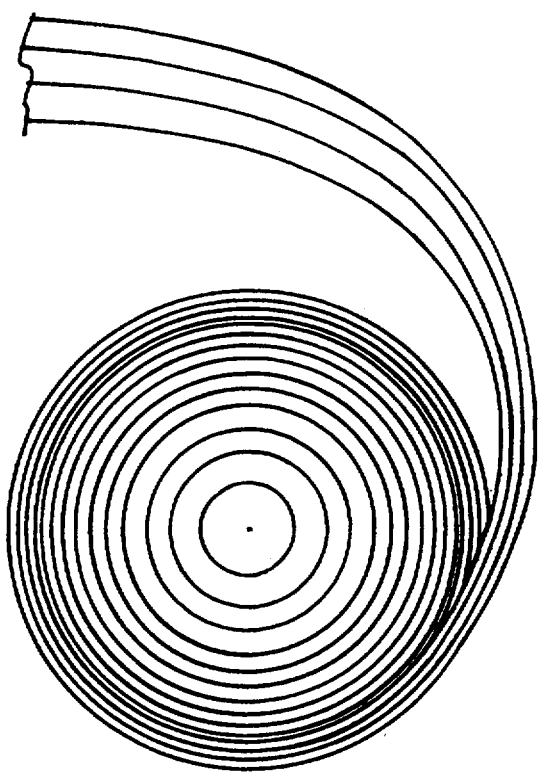
FIG. 3A is a diagram of involuted feed for a hydroclone separator
Figure 3B:
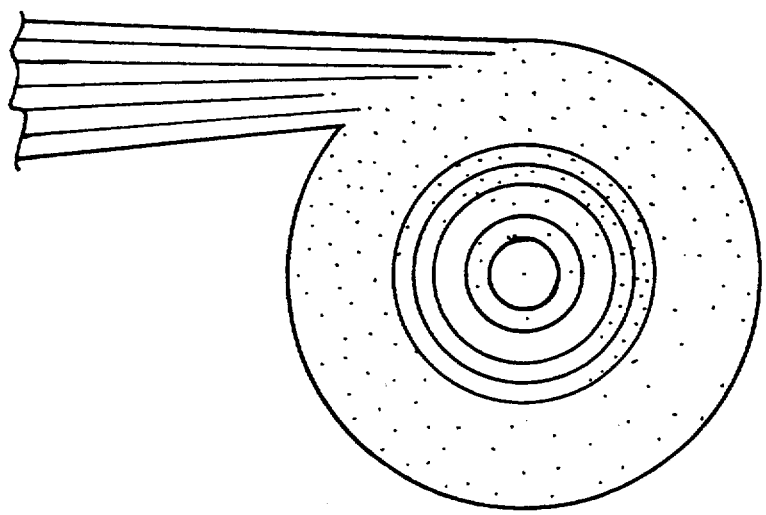
FIG. 3B is a diagram of tangential feed for a hydrocyclone separator.
Figure 4:
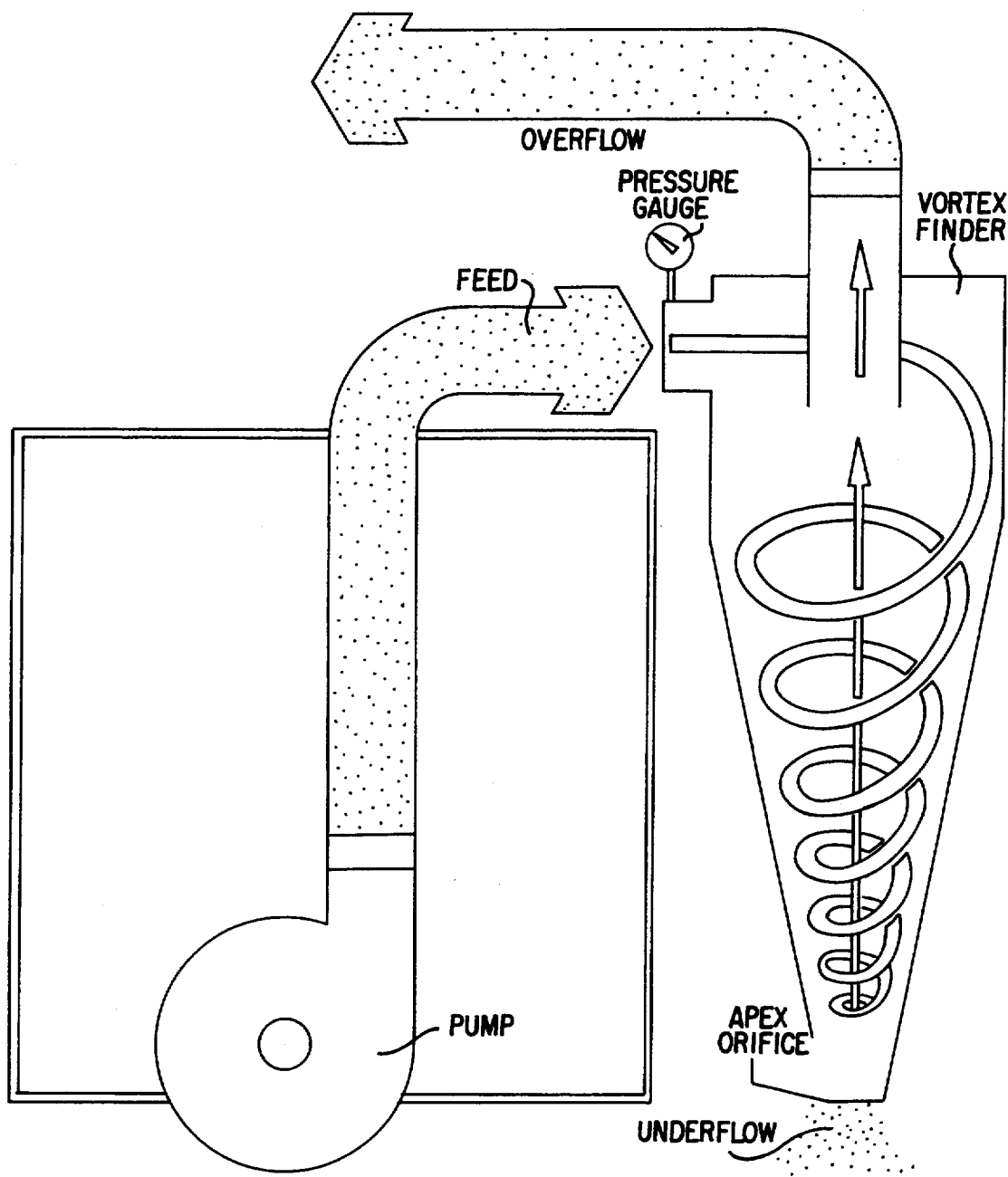
FIG. 4 is a schematic diagram of feed entering a Krebs hydrocyclone.

The enhanced gravity separator of the present invention is one in which the feed (i.e., the tar sand slurry) is subjected to defined gravitational forces tending to separate the heavier sand from the lighter fluids (e.g., water and bitumen) in less than about 5 seconds, preferably less than about 2 seconds. The most preferred enhanced gravitational separator is a hydrocyclone type of separator that has an "involuted" feed entrance, as opposed to a straight tangential type entrance (see FIG. 3), with a rectangular opening having its longitudinal length-wise dimension (i.e., the greater dimension) parallel to the axis of the cyclone. It is thought that an "involuted" feed entrance introduces the tar sand slurry with much less turbulence than a straight tangential type entrance. A preferred hydrocyclone is that sold by Krebs Engineers of Menlo Park, California. As shown in FIG. 4, the configuration of the hydrocyclone sold by Krebs Engineers introduces the tar sand slurry into the hydrocyclone along the inner wall, forcing the mixture to rotate at a high angular velocity. The kinetic energy of the tar sand feed stream is in this manner converted to centrifugal force. Essentially all of the solids are separated from the bitumen/hydrocarbon and water in less than about 5 seconds, typically less than about 2 seconds. Coarser and heavier solids are concentrated and discharged through the apex orifice as underflow. Most of the tar sand feed liquid (i.e., water plus bitumen) and a part of the very fine solids (i.e., fines) discharge through the vortex finder as overflow. The overflow (water plus bitumen plus fines) may be sent to a bitumen water separator to remove the bitumen which in turn may be sent directly to an upgrading or conversion unit with or without removal of a portion of the water or the solids. The removed fines plus water may be sent to one or more separators to remove the fines and recover water to be heated and recycled for admixing with Athabasca tar sands to produce more tar sand slurry. An alternative is to leave some of the fines and water with the bitumen to be processed in a special upgrading or conversion process, which utilizes a portion of the water and naturally occurring clays.

Preferably one or more chemical additive(s) or chemical agents(s) is or are added to the Athabasca tar sand-/water mixture or slurry either before or during mixing and/or agitation. The chemical additive(s) or chemical agent(s) may be kerosene, diesel, kerosene/diesel, MIBC (methyl-isobutyl-carbinol), calcium lignosulfonate (i.e. sold under the trademark Lignosite Road Binder 50% by Georgia Pacific), Petronate HL (i.e. petroleum sulfonate sold under the trademark WITCO Petronate HL), SC-177 (i.e. a $C_6$ to $C_9$ branched aliphatic alcohols and/or ketones sold under the trademark Sherex Shurcoal 177); DP-DNP-150; NP40/NP100; or mixtures of any of the foregoing. The chemical agent(s) is preferably kerosene and/or diesel in combination with DP and DNP, more preferably kerosene and/or diesel in combination with a 50/50 mixture of DP and DNP with each having 150 ethoxylated groups; or kerosene and/or diesel in combination with NP40 and NP100, preferably kerosene and/or diesel in combination with a 50/50 mixture of NP40 and NP100. The one or more chemical additive(s) may be added in any suitable quantity or proportions, but is preferably added in an amount or quantity ranging from about 25 to about 2500 parts of chemical additive(s) per one-million (1,000,000) parts of tar sands (i.e., sand plus bitumen plus connate water, etc); more preferably from about 50 ppm to about 1200 ppm; and most preferably from about 50 ppm to about 150 ppm.

Preferably after the tar sand slurry has been prepared, or after the tar sand slurry plus chemical additive(s) have been mixed together, the resulting liquid slurry is subjected to aeration before being introduced into the enhanced gravity separator (i.e., the hydrocyclone). Aeration may be at any suitable rate but preferably ranges from about 0.1 SCF of air per gallon of liquid slurry to about 1.0 SCF of air per gallon of liquid slurry; most preferably from about 0.2 SCF/gallon to about 0.5 SCF/gallon.

Preferably after the tar sand slurry has been aerated, or after the tar sand slurry plus chemical additive(s) have been aerated, the resulting aerated slurry is passed through one or more agitator(s) before being introduced into the enhanced gravity separator. The agitator(s) may be any suitable agitator (e.g., dynamic, static, etc.) but is preferably on one or more of the static mixers, such as any of those disclosed in co-pending application Ser. No. 341,772, filed Apr. 21, 1989, fully incorporated herein by reference thereto as if repeated verbatim hereafter.

Figure 5:
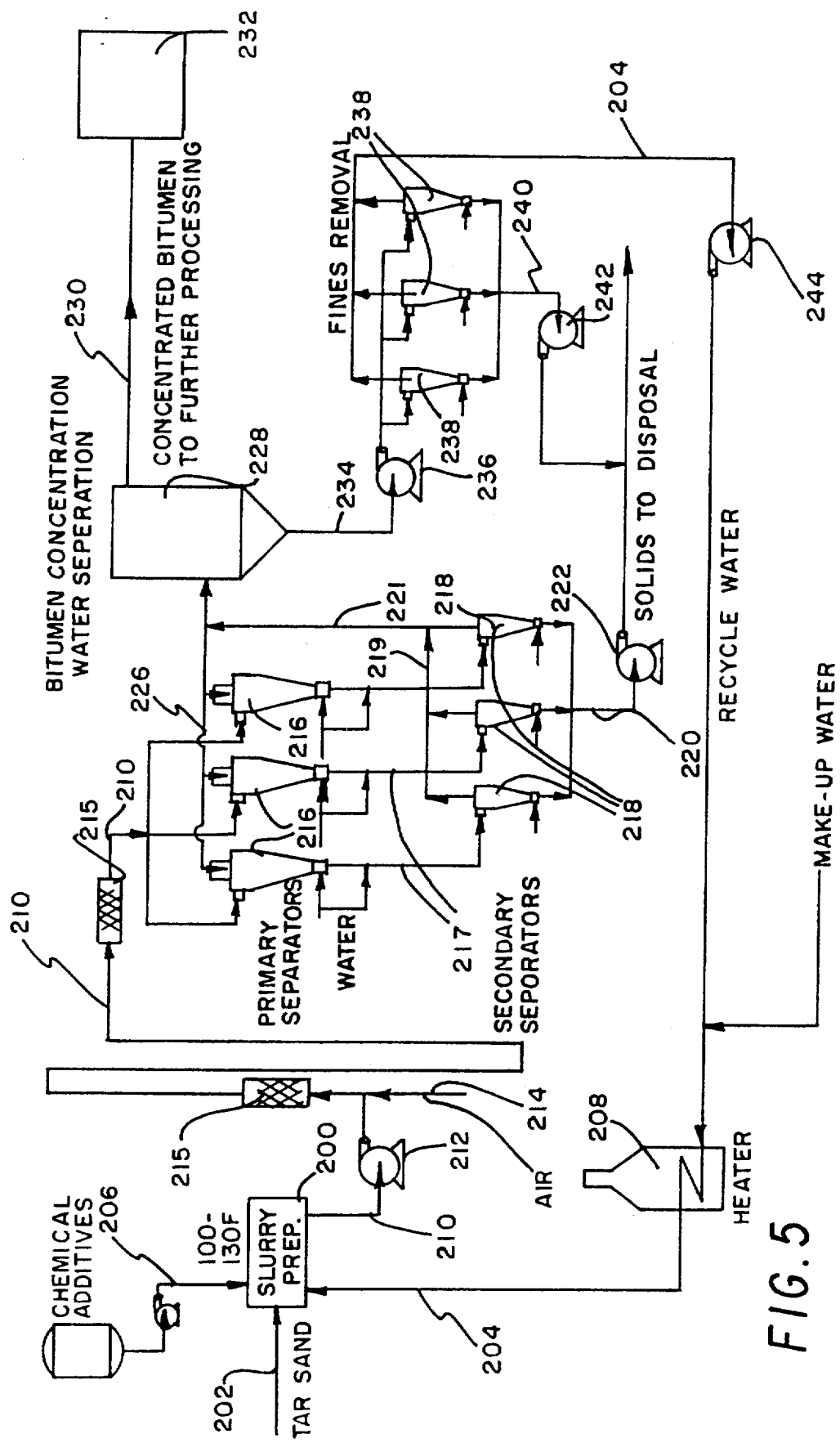
FIG. 5 is a schematic flow diagram illustrating a presently preferred embodiment and best mode of a novel process for recovering bitumen/hydrocarbon from tar sands.

Referring in detail now to FIG. 5 for another discussion of the present embodiment and best mode of the invention, there is seen a slurry preparation chamber 200 (e.g., a tumbler, mixer, etc.) having lines 202, 204 and 206 leading thereto. Athabasca tar sands pass through line 202 and into the slurry preparation chamber 200. As previously mentioned, Athabasca tar sands are water wet tar sands having a pH of from 6.0 to less than about 7.0, more likely around 6.5. An aqueous phase (i.e., water) passes through line 204 and into the slurry preparation chamber 200. The water may be make-up water from any suitable source, such as a retention pond, and/or recycled water. The water is preferably heated first by heater 208 such that when the heated water is admixed with the Athabasca tar sands, or with the Athabasca tar sands and any one or more chemical additive(s) that pass through line 206 and into the slurry preparation chamber 200, the resulting tar sand slurry has a temperature of from about 75° F. to about 200° F., more preferably from about 100° F. to about 130° F.

The one or more chemical additive(s) or agent(s) may be any chemical that is capable of assisting the removal of bitumen from sand, especially when admixed with hot water and agitated. Preferably, the chemical additive or agent is one or more of the following chemicals: kerosene, diesel, MIBC, Petronate HL, SC-177, and calcium lignosulfate, NP40/NP100, DP-150/DNP-150, and mixtures thereof. Preferably the chemical agent comprises at least one ethoxylated alkylphenol compound having the general formula:

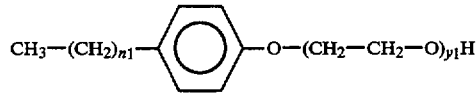

wherein $n_1$ is an integer having a value of from about 7 to about 20, and $Y_1$ is an integer having a value of from about 4 to about 1000; and said at least one ethoxylated alkylphenol compound has a molecular weight distribution with a dispersity of from about 1.0 to about 5.0 and with a weight average molecular weight of from about 1966 to about 9188; and wherein at least about 50% by weight of the chemical agent comprises said at least one ethoxylated alkylphenol compound having a molecular weight of from about 1966 to about 9188. From 1% by weight to about 90% by weight of the chemical agent comprises the at least one ethoxylated alkylphenol wherein $Y_1$ has a value greater than 100. Preferably, the chemical agent comprises from about 30% by weight to about 80% by weight of the at least one ethoxylated alkylphenol compound; and/or the chemical agent additionally comprises at least one ethoxylated dialkylphenol compound having the general formula:

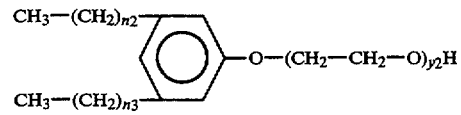

wherein $n_2$ is an integer having a value of from about 7 to about 18, and $n_3$ is an integer having a value of from about 7 to about 18, and $y_2$ is an integer having a value of from about 4 to about 1000; and wherein said at least one ethoxylated dialkylphenol compound and said at least one ethoxylated alkylphenol compound have a molecular weight distribution with a dispersity of from about 1.0 to about 5.0 and with a weight average molecular weight of from about 1966 to about 11,627; and wherein at least about 50% by weight of the chemical agent comprises said at least one ethoxylated alkylphenol compound having at least one ethoxylated dialkylphenol compound having a molecular weight of from about 2519 to about 11,627; and from 1% by weight to 90% by weight of the chemical agent comprises said at least one ethoxylated dialkylphenol compound wherein $y_2$ is greater than 100. Stated alternatively, the chemical additive or agent may be those chemicals or compounds represented by general formula (1) and/or general formula (1A) and/or general formula (2) and/or general formula (2A), all as previously defined above as a flotation additive for the water/sludge slurry (as depicted in FIG. 2) including having at least 1% by weight with $y_1$ and $y_2$ greater than 100. Stated alternatively further, the chemical additive may be a 50/50 mixture of NP-40/NP-100 or DP-150/DNP-150 as stated and defined above.

The conditioned and prepared tar sand slurry leaves the slurry preparation chamber 200 via line 210 and is pumped by pump 212, which is preferably a centrifugal pump causing agitation of the tar sand slurry, at a rate of 10 to 30 gallons per minute towards one or more hydrocyclones 216 (i.e., primary separator). As the tar sand slurry is being pumped through line 210, air is introduced into line 210 via line 214 at a rate of from about 1 to about 20 SCF/minute. After aeration, the aerated tar sand slurry passes through one or more static mixers (or agitators) 215 for further agitation and then into one or more involuted feed hydrocyclones 216 where bitumen and water and fines are removed through the vortex finder and separated from the coarser solids, which are discharged through the apex orifice of each hydrocyclone 216 as underflow. The aerated tar sand slurry, in addition to being agitated by pump 212 and static mixer 215, may be further agitated by extending the length of line 210, say to 100 feet or greater.

The bitumen, water and fines mixture is sent from the vortex finder of each hydrocyclone 216 through line 226 and into a bitumen/water separator 228 where bitumen is separated from the water and fines. Bitumen leaves the separator 228 via line 230 to an upgrading unit 232 where the bitumen is upgraded into one or more lighter products. The upgrading unit by way of example only includes coking (both fluid and delayed), hydrovisbreaking, thermal visbreaking, and hydrocracking. Some of the water and fines (clays) may be retained in the bitumen for processing in a special upgrading unit which utilizes carbonmonoxide to assist in the bitumen conversion.

Water and fines leave the separator 228 through line 234 and are pumped by pump 236 towards one or more hydrocyclones 238 where water is removed through the vortex finder of each hydrocyclone 238 from the fines that pass out of each hydrocyclone 238 into line 240 where they are sent to disposal. Water passes into line 204 where pump 244 pumps the water as recycle water through heater 208 for heating and subsequently to the slurry preparation chamber 200. Make-up water (from a retention pond, etc.) may be added to the recycle water.

As the coarser solids pass through the apex orifice of each hydrocyclone 216 and into line 217, water may be added or admixed therewith and the resulting mixture is then sent to one or more hydrocyclones 218 for removal of any entrained residual bitumen in the coarser solids. More specifically, water and coarser solids (including entrained bitumen) is sent to one or more hydrocyclones 218 where residual bitumen and water (and possibly residual fines) are removed through the vortex finder of each hydrocyclone 218 and pass into line 219. Line 219 hooks into line 221 to pass residual bitumen and water (and possibly residual fines) from line 219 into line 221. Line 221 leads into line 226, which as previously mentioned conducts bitumen, water and fines to the separator 228. The coarser solids, absent essentially all fines and residual bitumen and water, leave the hydrocyclone(s) 218 through line 220 where pump 222 pumps the coarser solids to disposal.

The invention will be illustrated by the following set forth examples which are given by way of illustration and not by any limitation. All parameters such as concentrations, mixing proportions, temperatures, pressure, rates, compounds, etc., submitted in these examples are not to be construed to unduly limit the scope of the invention.

EXAMPLE I

FIGS. 6,7,8 and 9 depict Process Option 1, Process Option 2, Process Option 3, and Process Option 4, respectively, for operation of the present invention. Process Option 1 is slurry preparation followed by primary and secondary separation and recycle of bottoms from the bitumen concentrates step to slurry preparation. Process Option 2 is essentially the same as Option 1 with the elimination of the secondary separation and recycle step from Option 1. Process Option 3 includes primary and secondary separation with combination of the bottoms from bitumen concentration with the bitumen concentrate product, rather than recycle of this stream to slurry preparation. Process Option 4 is essentially the same as Option 3 with the exception that there is no secondary separation.

Common in all Process Options 1,2,3 and 4 are the following primary steps:

Slurry Preparation: This step involves mixing of the raw tar sand with water and chemicals of the present invention and heating to the desired operating temperature. Agitation is required to break up the sand matrix and free the bitumen. The role of the chemical additives is to aid in the sand/bitumen separation and also to condition the bitumen droplets for air attachment. Screening of the slurry may also be included in this step to prevent passage of oversize material to downstream units.

Primary Separation: Following slurry preparation air is introduced into the slurry and aerated slurry is pumped to the primary separation units (hydrocyclones) for separation of solids (i.e., sand) from the liquids (i.e., water and bitumen) in five (5) seconds or less. Residence time and mixing is required in the pipeline to the separators to provide time for air attachment. An alternative to direct air injection is injection of pressurized water containing dissolved air which is released from solution in the slurry. In the primary hydrocyclones the bulk of the sand is rejected to a tailings stream while most of the water, bitumen and fines go overhead.

Bitumen Concentration: The overhead stream from the primary separators contains mostly water which is separated from the bitumen before the bitumen can be transported and processed. This unit may be any conventional separators or settler such as an open vessel in which the majority of the bitumen rapidly floats to the surface and is skimmed off with some water and solids. The heavier solids and some bitumen sinks to the bottom and is recovered as a tails stream. A side stream is withdrawn which contains most of the water, fines and some bitumen. Bitumen recovery from this vessel is accomplished within several hours or less. The water-rich side stream may be sent elsewhere for further clarification which may occur in a vessel or pond with a residence time of 24 hours or less.

Secondary Separation: The tails stream from the primary separators contains 10 to 20% of the feed bitumen and may be further processed to recover part of this potentially lost product. This unit consists of hydrocyclones similar to the primary separators. The feed to this system is diluted with water before it is treated.

Fines Removal: The water stream from the bitumen concentration step may be recycled to slurry preparation for balance of the water system However, this stream contains most of the fines from the tar sand feed. The fines may be removed by hydrocyclones or in settling ponds or tanks. The preferred method is the use of hydrocyclones which limits residence time and reduces bitumen losses.

TABLE I

Figure 6:
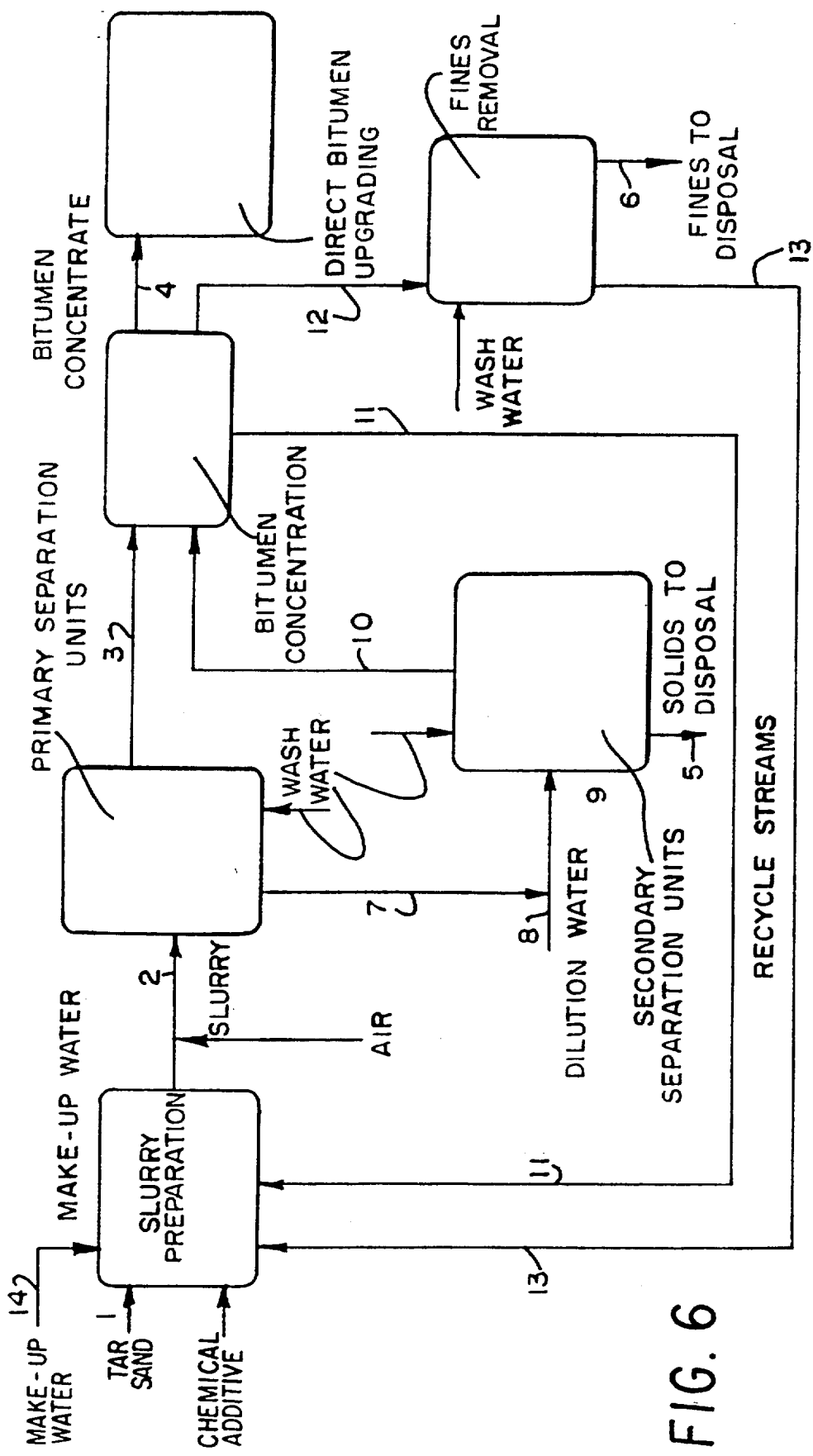
FIG. 6 is a schematic flow diagram for an embodiment (i.e. Process Option 1) of the present invention.

The following Table I represents the flow/rates (lbs/hr) for the streams (i.e. stream 1, stream 2 ... stream 14) in FIG. 6 (i.e. Process Option 1) including the recovered bitumen concentrate (i.e. stream 4) and the recovered sand (i.e. streams 5, 7 and 6):

| | FLOW RATES, LBS/HR | | | | | | |
|---|---|---|---|---|---|---|---|
| | 1<br>Tar Sand Feed | 2<br>Tar Sand Slurry | 3<br>FSU Overhead | 4<br>Bitumen Concentrate | 5<br>Coarse Solids | 6<br>Fine Solids | 7<br>FSU Tails |
| Tar Sand, (1,000 tons/day) | | | | | | | |
| Bitumen | 8467 | 13009 | 11708 | 7950 | 390 | 127 | 1301 |
| Solids > 44 microns | 67189 | 69873 | 2096 | 1445 | 65743 | 0 | 67777 |
| Solids < 44 microns | 4061 | 17070 | 15021 | 2019 | 246 | 1797 | 2048 |
| Water | 3617 | 233220 | 164696 | 4892 | 65599 | 5263 | 68524 |
| Total | 83333 | 333171 | 193521 | 16305 | 131978 | 7186 | 139650 |
| | 8<br>Dilution Water | 9<br>Secondary Feed | 10<br>Secondary Overhead | 11<br>Concentrato Tails | 12<br>Water/ Fines | 13<br>Recycle Water | 14<br>Make-up Water |
| Bitumen | | 1301 | 911 | 4246 | 423 | 296 | |
| Solids > 44 microns | | 67777 | 2033 | 2684 | 0 | 0 | |
| Solids < 44 microns | | 2048 | 1803 | 12691 | 2114 | 317 | |
| Water | 65718 | 134242 | 68643 | 19622 | 208825 | 203562 | 6419 |
| Total | 65718 | 205368 | 73389 | 39243 | 211362 | 204175 | 6419 |

TABLE II

Figure 7:
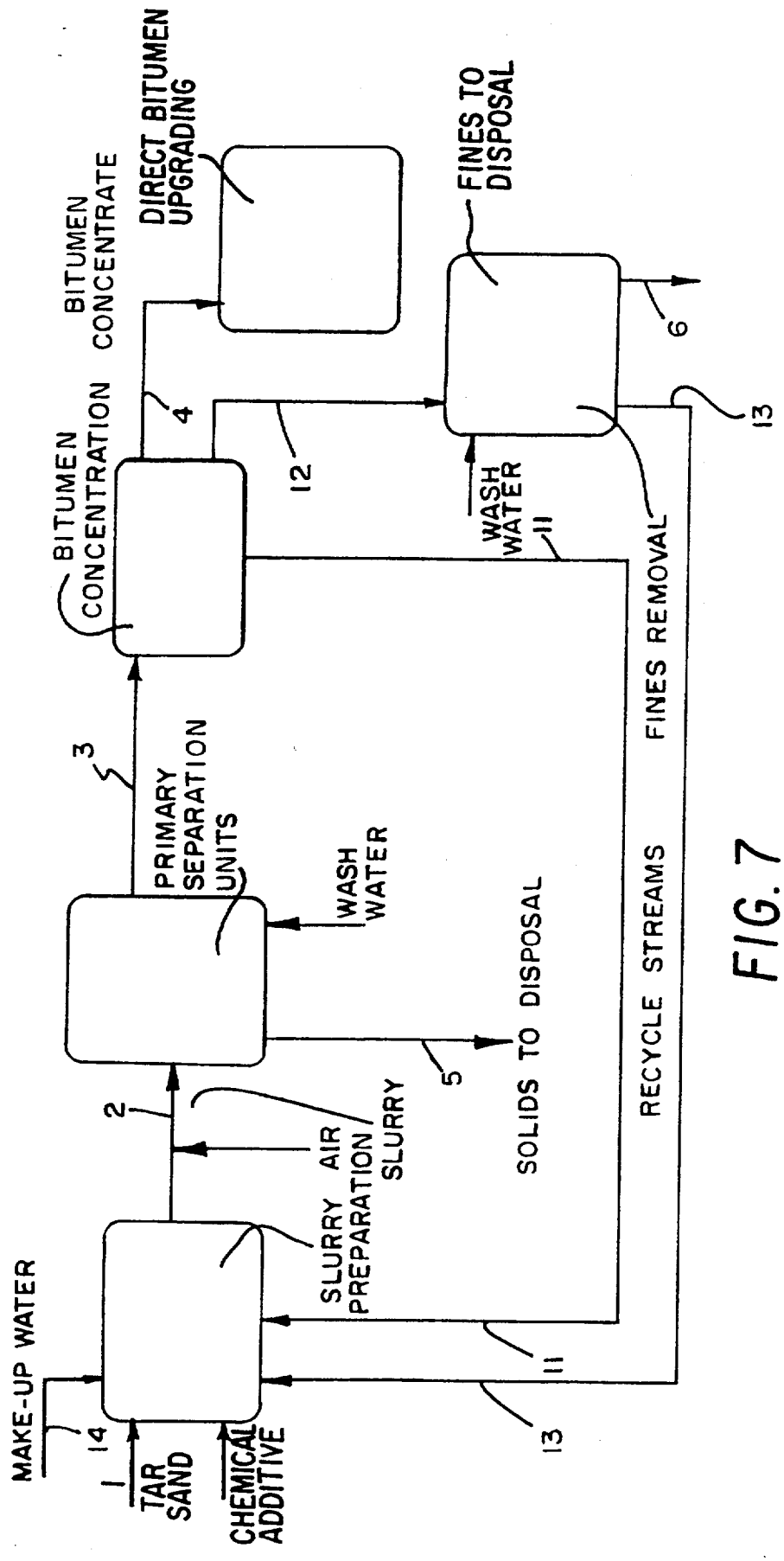
FIG. 7 is a schematic flow diagram for an embodiment (i.e. Process Option 2) of the present invention.

The following Table II represents the flow/rates (lbs/hr) for the streams (i.e. stream 1, stream 2 ... stream 14) in FIG. 7 (i.e. Process Option 2) including the recovered bitumen concentrate (i.e. stream 4) and the recovered sand (i.e. streams 5 and 6):

| | FLOW RATES, LBS/HR | | | | | |
|---|---|---|---|---|---|---|
| | 1<br>Tar Sand Feed | 2<br>Tar Sand Slurry | 3<br>FSU Overhead | 4<br>Bitumen Concentrate | 5<br>Coarse Solids | 6<br>Fine Solids |
| Tar Sand, (1,000 tons/day) | | | | | | |
| Bitumen | 8467 | 12286 | 11058 | 6966 | 1229 | 272 |
| Solids > 44 microns | 67189 | 68525 | 2056 | 720 | 66469 | 0 |
| Solids < 44 microns | 4061 | 12885 | 11339 | 1361 | 1546 | 1154 |
| Water | 3617 | 218625 | 151838 | 3877 | 66787 | 3192 |
| Total | 83333 | 312321 | 176290 | 12924 | 136031 | 4618 |
| | | | | 11<br>Concentrato Tails | 12<br>Water/ Fines | 13<br>Recycle Water | 14<br>Make-up Water |
| Bitumen | | | | 3820 | 272 | 0 | |
| Solids > 44 microns | | | | 1336 | 0 | 0 | |
| Solids < 44 microns | | | | 8620 | 1358 | 204 | |
| Water | | | | 13776 | 134185 | 130993 | 70239 |
| Total | | | | 27552 | 135815 | 131197 | 70239 |

TABLE III

Figure 8:
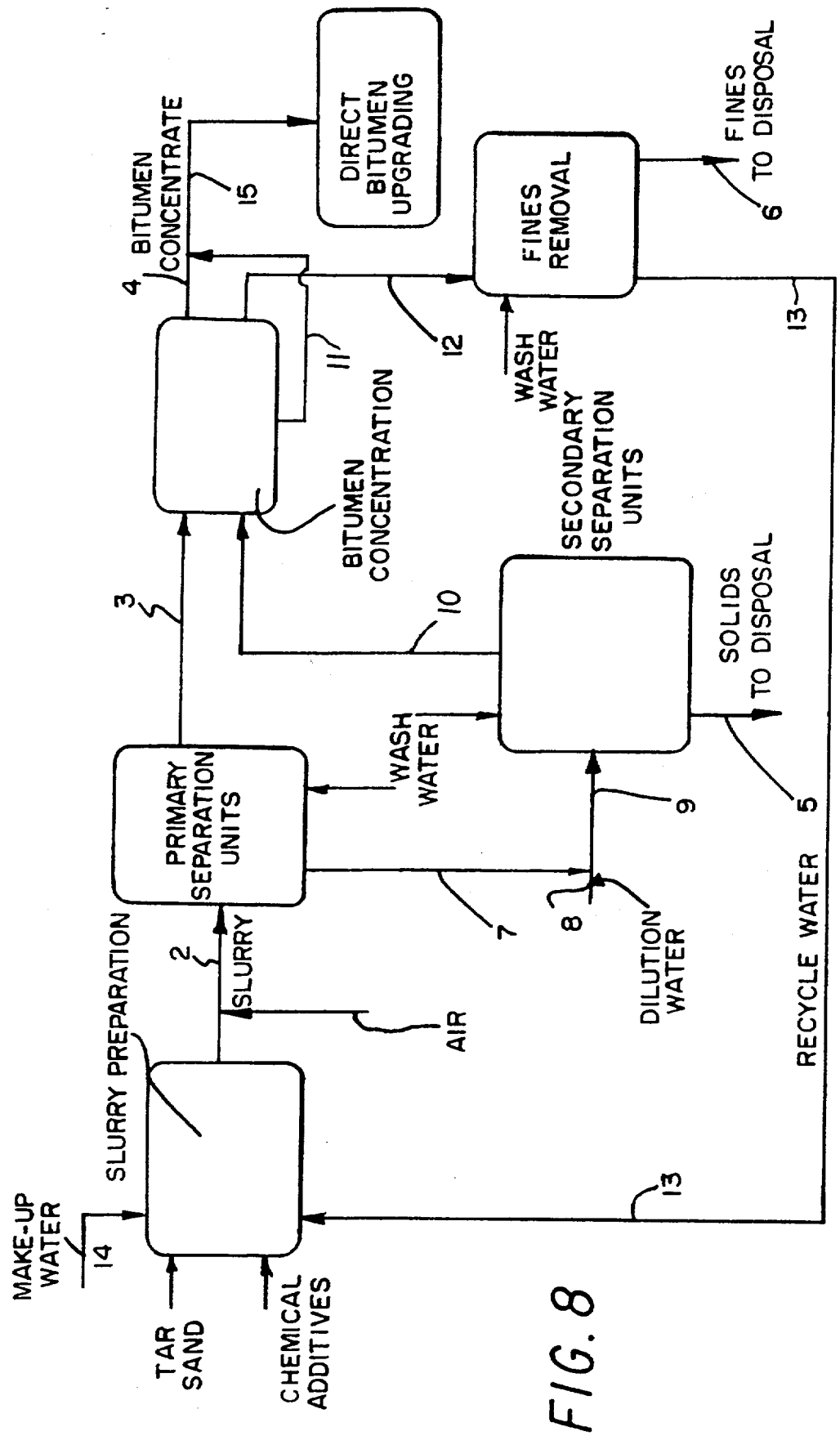
FIG. 8 is a schematic flow diagram for an embodiment (i.e. Process Option 3) of the present invention.

The following Table III represents the flow/rates (lbs/hr) for the streams (i.e. stream 1, stream 2 ... stream 15) in FIG. 8 (i.e. Process Option 3) including the recovered bitumen concentrate (i.e. stream 4) and the recovered sand (i.e. streams 5, 7 and 6):

| FLOW RATES, LBS/HR | | | | | | |
|---|---|---|---|---|---|---|
| 1<br>Tar Sand | 2<br>Tar Sand | 3<br>FSU | 4<br>Bitumen | 5<br>Coarse | 6<br>Fine | 7<br>FSU |

TABLE III-continued

|  | Feed | Slurry | Overhead | Froth | Solids | Solids | Tails |
|---|---|---|---|---|---|---|---|
| Tar Sand, (1,000 tons/day) | | | | | | | |
| Bitumen | 8467 | 8715 | 7844 | 5326 | 261 | 107 | 872 |
| Solids > 44 microns | 67189 | 67189 | 2016 | 1390 | 63218 | 0 | 65173 |
| Solids < 44 microns | 4061 | 4328 | 3808 | 512 | 62 | 1511 | 519 |
| Water | 3617 | 187208 | 122387 | 3098 | 63019 | 4425 | 64821 |
| Total | 83333 | 267440 | 136055 | 10325 | 126560 | 6043 | 131385 |

|  | 8 Dilution Water | 9 Secondary Feed | 10 Secondary Overhead | 11 Concentrato Tails | 12 Water/ Fines | 13 Recycle Water | 14 Make-up Water | 15 Bitumen Concentrate |
|---|---|---|---|---|---|---|---|---|
| Tar Sand, (1,000 tons/day) | | | | | | | | |
| Bitumen |  | 872 | 610 | 2773 | 355 | 249 |  | 8099 |
| Solids > 44 microns |  | 65173 | 1955 | 2581 | 0 | 0 |  | 3971 |
| Solids < 44 microns |  | 519 | 457 | 1976 | 1777 | 267 |  | 2488 |
| Water | 61828 | 126649 | 63630 | 7330 | 175590 | 171165 | 12427 | 10428 |
| Total | 61828 | 193213 | 66653 | 14660 | 177723 | 171680 | 12427 | 24985 |

TABLE IV

Figure 9:
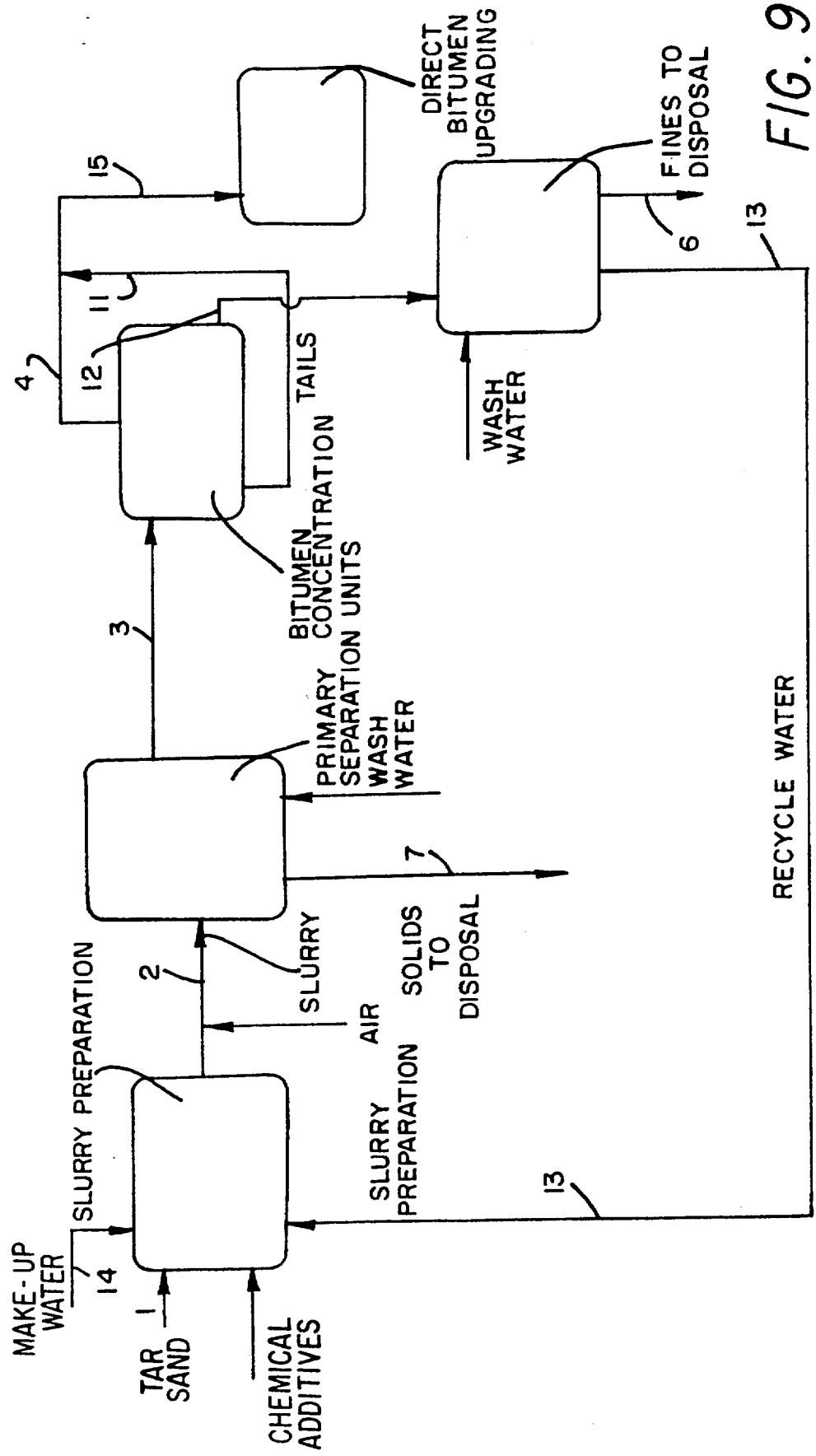
FIG. 9 is a schematic flow diagram for an embodiment (i.e. Process Option 4) of the present invention.
Figure 10:
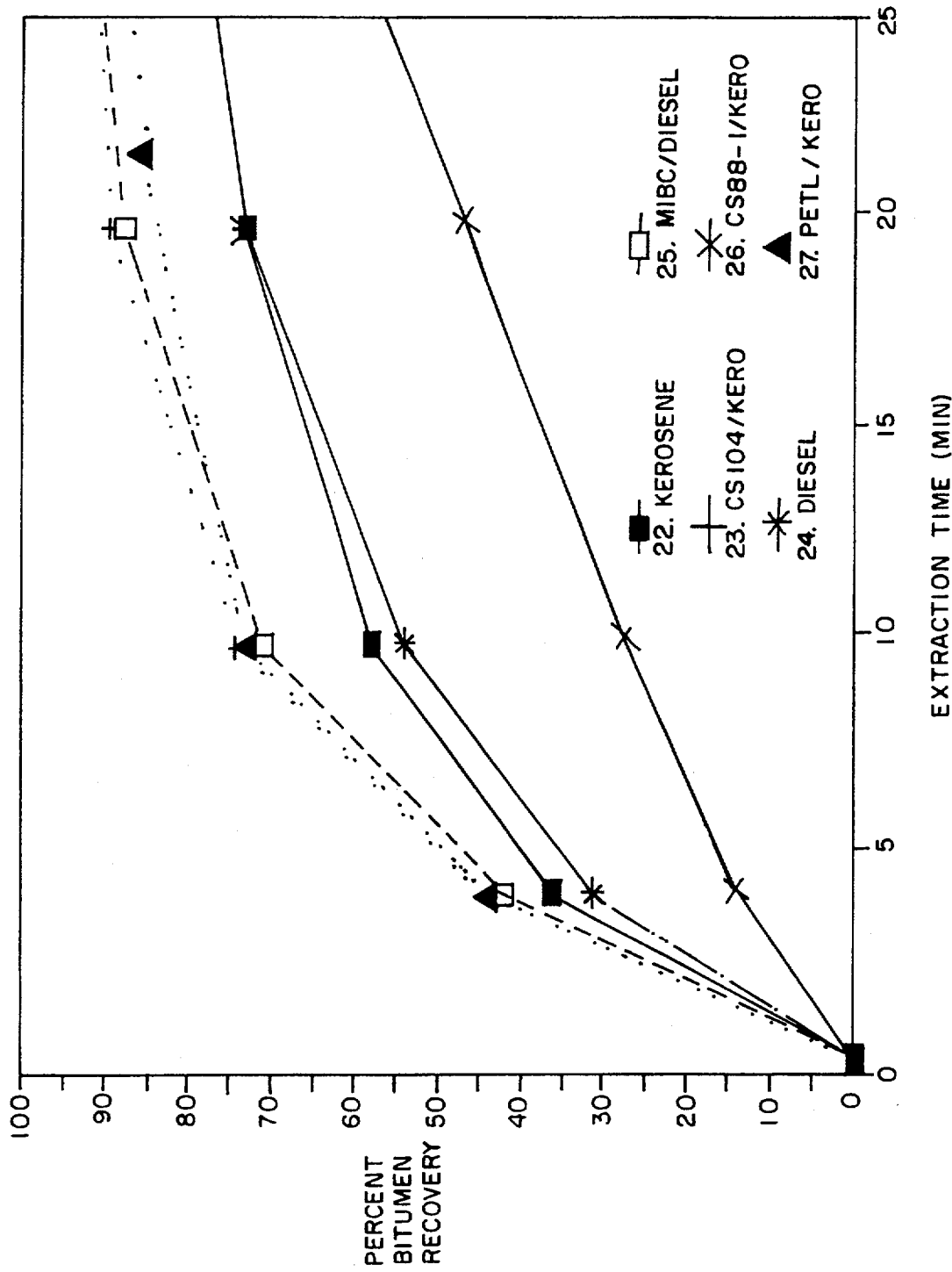
FIG. 10 is a graph of bitumen extraction test results for runs 22 to 27.
Figure 11:
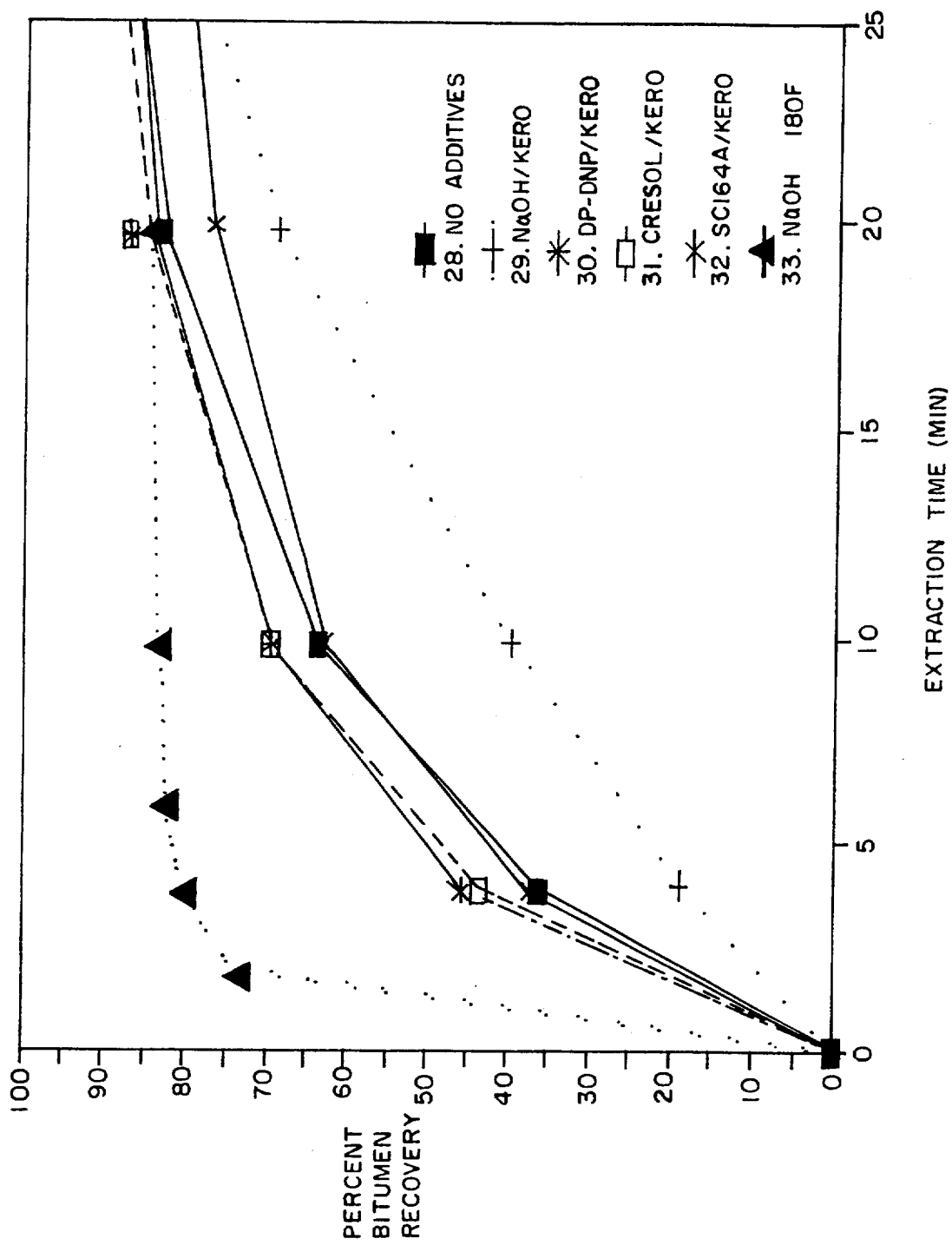
FIG. 11 is a graph of bitumen extraction test results for runs 28 to 33.
Figure 12:
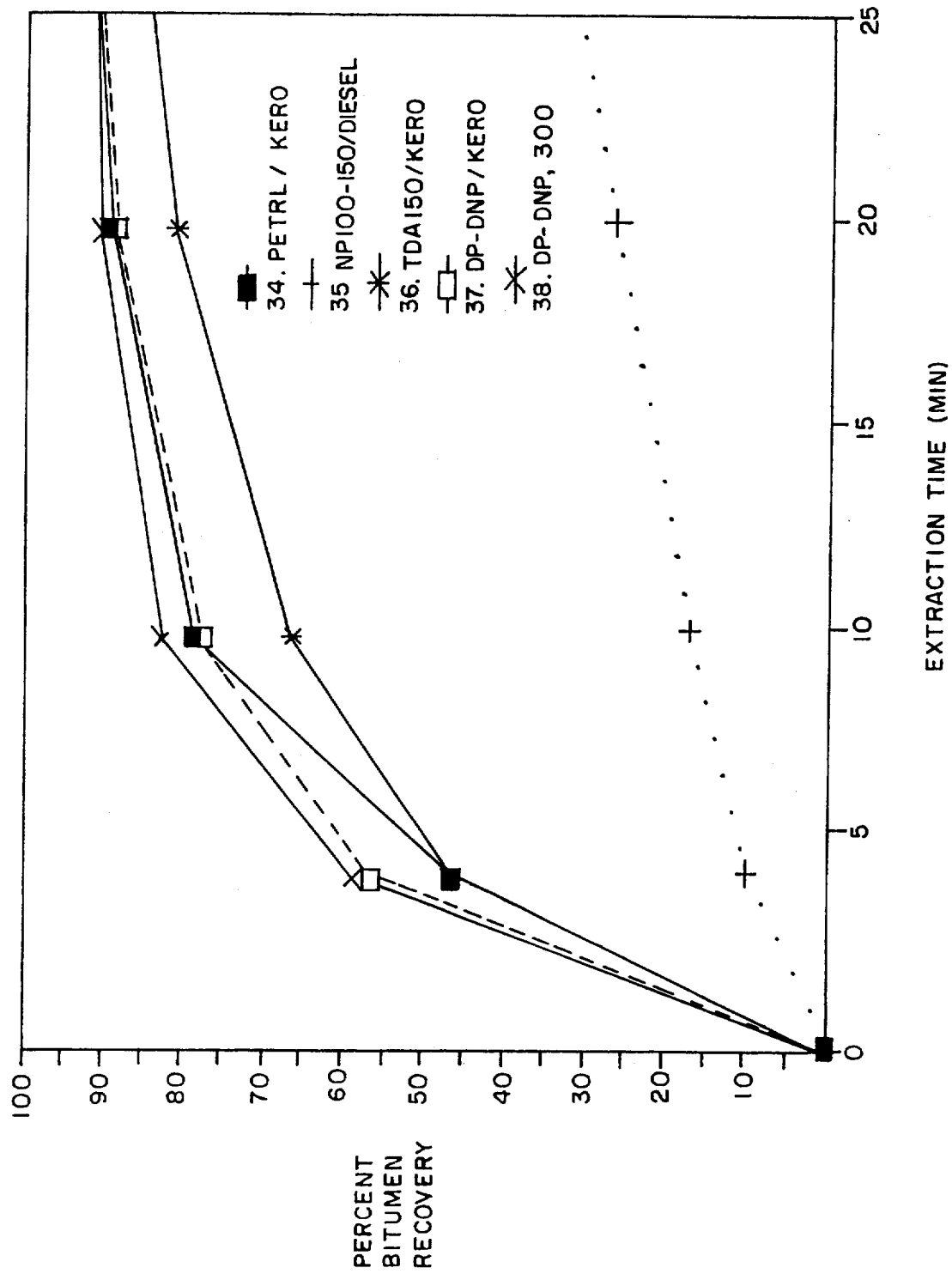
FIG. 12 is a graph of bitumen extraction test results for runs 34 to 38.
Figure 13:
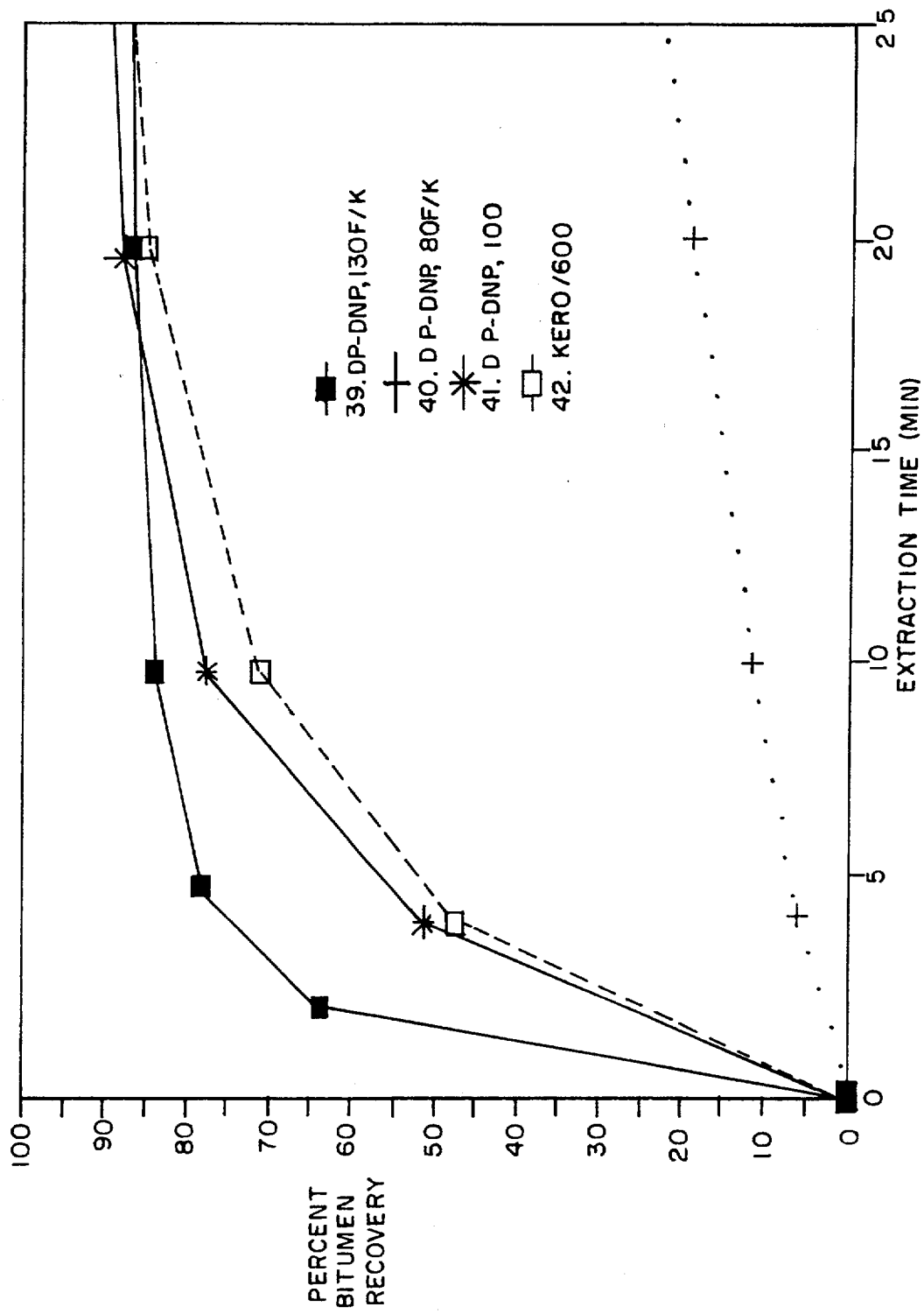
FIG. 13 is a graph of bitumen extraction test results for runs 39 to 42.

The following Table IV represents the flow/rates (lbs/hr) for the streams (i.e. stream 1, stream 2 . . . stream 15) in FIG. 9 (i.e. Process Option 4) including the recovered bitumen concentrate (i.e. stream 4) and the recovered sand (i.e. streams 7 and 6):

| | FLOW RATES, LBS/HR | | | | | |
|---|---|---|---|---|---|---|
| | 1 Tar Sand Feed | 2 Tar Sand Slurry | 3 FSU Overhead | 4 Bitumen Froth | 6 Fine Solids | 7 Coarse Solids |
| Tar Sand, (1,000 tons/day) | | | | | | |
| Bitumen | 8467 | 8627 | 7764 | 4892 | 69 | 863 |
| Solids > 44 microns | 67189 | 67189 | 2016 | 705 | 0 | 65173 |
| Solids < 44 microns | 4061 | 4233 | 3725 | 447 | 975 | 508 |
| Water | 3617 | 186781 | 121963 | 2590 | 2855 | 64818 |
| Total | 83333 | 266831 | 135468 | 8634 | 3899 | 131362 |

| | 11 Bit. Conc. Tails | 12 Water/ Fines | 13 Recycle Water | 14 Make-up Water | 15 Bitumen Concentrate |
|---|---|---|---|---|---|
| Bitumen | 2644 | 229 | 161 |  | 7535 |
| Solids > 44 microns | 1310 | 0 | 0 |  | 2016 |
| Solids < 44 microns | 2132 | 1147 | 172 |  | 2579 |
| Water | 6085 | 113287 | 110432 | 72732 | 8676 |
| Total | 12171 | 114663 | 110765 | 72732 | 20805 |

TABLE V

SUMMARY OF FSU PROCESS OPTIONS

| | Option 1 | Option 2 | Option 3 | Option 4 |
|---|---|---|---|---|
| Bitumen Retention, wt % | 93.9 | 82.3 | 95.7 | 89.0 |
| Sand Rejection, wt % | 95.1 | 97.1 | 90.9 | 93.6 |
| Bitumen Concentrate Composition | | | | |
| Bitumen, wt % | 48.8 | 53.9 | 32.4 | 36.2 |
| Sand, wt % | 8.9 | 5.6 | 15.9 | 9.7 |
| Fines, wt % | 12.4 | 10.5 | 10.0 | 12.4 |
| Water, wt % | 30.0 | 30.0 | 41.7 | 41.7 |
| Bitumen, vol % | 55.1 | 59.0 | 37.9 | 41.2 |
| Sand, vol % | 4.0 | 2.4 | 7.4 | 4.4 |
| Fines, vol % | 7.0 | 5.8 | 5.8 | 7.0 |
| Water, vol % | 33.9 | 32.8 | 48.8 | 47.4 |
| Total Flow, lb/hr: | | | | |
| to Primary Sep. | 333171 | 312321 | 267440 | 266831 |
| to Secondary Sep. | 205368 | 0 | 193213 | 0 |
| to Bit. Conc. | 266910 | 176290 | 76978 | 135468 |
| to Fines Removal | 211362 | 135815 | 177723 | 114663 |
| Bitumen Concentrate | 16305 | 12924 | 24985 | 20805 |

EXAMPLE II

Bench Scale Laboratory Testing

The bench scale test program for evaluation of potential bitumen separation additives (i.e. the chemical additives) and processing conditions and results are presented below. Promising additive combinations have been identified and were evaluated in the pilot hydrocyclone. The results of the tests indicate the sand reduction concept of this invention is feasible.

SUMMARY

Potential chemical additives for enhancement of bitumen separation from tar sands were selected for use in the pilot tests of the hydrocyclone separator. A bench scale experimental program was used to screen combinations of commercial and experimental chemical additives. The apparatus and procedures used were based on modifications of published methods used by Syncrude Ltd. for bench scale evaluation of the hot water-caustic wash process. Forty-two runs were completed in which 500 g of tar sand were slurried with water and additives and subjected to a controlled mixing and separation procedure. Product was collected from the separation vessel at set times throughout the test and analyzed for bitumen, solids and water content. The effectiveness of each additive composition was evaluated based on the rate of bitumen separation, the total bitumen recovered, the rejection of sand from the product, and the quality of the water recovered from the separation vessel.

Five chemical agents including methyl isobutyl carbinol (MIBC), Petronate HL, Sherex Shurcoal 177, CS104 (a 50/50 mixture of NP-40 and NP-100), and DP-DNP-150 (a 50/50 mixture DP-150 and DNP-150)

in combination with kerosene and/or diesel are recommended. Use of these additives significantly enhanced the rate of bitumen recovery, the total bitumen recovered and the rejection of sand from the recovered product. The additives were effective at temperatures as low as 100° F. (38° C.) and at treatment rates from 100 to 600 ppm based on total tar sand feed.

The most effective combination of additives was found to be DP-DNP-150 (a 50/50 mixture of ethoxylated dodecyl phenol and dinonyl phenol with 150 EO groups) at 300 ppm based on total tar sand feed and kerosene at 600 ppm based on total tar sand feed. Use of this additive package at 100° F. yielded a total recovery of 92.8% of the bitumen feed, rejection of 85% of the sand and clay, a bitumen separation rate of 14.7%/min (based on total bitumen feed), and an acceptable water quality for recycle. At a DP-DNP-150 treatment rate of 100 ppm based on slight reduction in performance was observed. Tests at a lower temperature (80° F.) resulted in poor separation.

EXPERIMENTAL PROCEDURES AND MATERIALS

The experimental and analytical procedures for evaluation of the chemical additives were modified and improved as the tests progressed and experience in operation of the system was gained.

The additives used in the screening tests were selected from commercially available materials which are used in coal cleaning operations and from surfactants which have been previously used in operations relating to emulsification of bitumen. The additives used are listed in Table VI. below.

TABLE VI
Additives Tested in Screening Tests

| | | |
|---|---|---|
| 1. | MIBC - | Methyl Isobutyl Carbinol |
| 2. | SC177 - | Sherex Shurcoal 177 (Alcohols & Ketones) |
| 3. | SC164a - | Sherex Shurcoal 164a (Alcohols & Ketones) |
| 4. | DPM - | Dipropylene glycol monomethyl ether |
| 5. | PetHL - | Petronate HL (Sodium petroleum sulfonate) |
| 6. | PetL - | Petronate L HL (Sodium petroleum sulfonate) |
| 7. | Cresol - | |
| 8. | NP12 - | Ethoxylated nonyl phenol with 12 EO's |
| 9. | NP20 - | Ethoxylated nonyl phenol with 20 EO's |
| 10. | CS104 or CS 83 | NP-40 + NP100 |
| 11. | NP100-150 - | Mixture of ethoxylated nonyl phenols with 100 and 150 EO's |
| 12. | TDA-150 - | Ethoxylated tridecyl alcohol with 150 EO's |
| 13. | DP-DNP-150 - | Mixture of ethoxylated dodecyl phenol and dinonyl phenol with 150 EO's. |

TEST RESULTS

After a series of 16 preliminary tests during which experimental procedures were modified and refined, a test program was initiated in which established procedures were used for consistency between evaluations. Based on results of the preliminary test phase, a base condition was established for comparison of the various additive combinations. The base test conditions included the following:

| | |
|---|---|
| Operating temperature | 100° F. |
| Sample size | 500 g. |
| Slurry water for conditioning | 150 ml |
| Chemical 1 | kerosene |
| Chemical 1 concentration | 600 ppm |
| Chemical 2 | MIBC |
| Chemical 2 concentration | 600 ppm |

In addition to tests of various combinations of additives, the use of caustic at 180° F. was tested for comparison with the standard hot water-caustic wash process.

The results of test runs 16 through 42 are summarized in the following Table VII.

TABLE VII
Summary of Flotation Results - Additive Screening Tests

| Run No. | Additive 1/ ppm | Additive 2/ppm | Temp. F. | Feed Conc. % (1) | Init. Rate %/min (2) | Recov. @ 20 Min % (3) | Total Recov. % (4) | Tail. Bit. % (5) | Bit. Mat. Bal. % (6) | Product Composition Bitumen wt. % | Water wt. % | Solids wt. % | Sand Reject. % (7) | Water Qual @ 24 Hr (8) |
|---|---|---|---|---|---|---|---|---|---|---|---|---|---|---|
| 16 | MBC/600 | Kero/600 | 100 | 10.4 | 2.3 | 77.5 | 93.6 | 0.67 | 99.0 | 30.3 | 27.2 | 42.3 | 84.3 | 3 |
| 17 | MBC/600 | Kero/600 | 100 | 11.5 | 9.4 | 79.5 | 89.7 | 1.14 | 99.0 | 32.2 | 27.0 | 40.8 | 84.7 | 4 |
| 18 | SC177/600 | Kero/600 | 100 | 9.9 | 11.1 | 82.3 | 92.0 | 0.57 | 99.0 | 21.4 | 22.3 | 56.3 | 72.5 | 5 |
| 19 | MBC-NP12 | Kero/600 | 100 | 10.4 | 10.3 | 79.9 | 90.3 | 0.96 | 99.0 | 23.2 | 27.7 | 49.1 | 76.9 | 7 |
| 20 | MBC/600 | Dies./600 | 100 | 11.1 | 14.5 | 86.0 | 91.6 | 0.68 | 99.0 | 34.2 | 24.2 | 41.6 | 85.6 | 6 |
| 21 | DPM/600 | Kero/600 | 100 | 10.7 | 8.2 | 72.1 | 89.3 | 1.03 | 99.0 | 26.0 | 22.0 | 52.1 | 77.7 | 6 |
| 22 | Kero/600 | | 100 | 10.1 | 9.0 | 72.8 | 88.9 | 1.00 | 99.0 | 23.7 | 26.4 | 49.9 | 78.1 | 2 |
| 23 | CS104/600 | Kero/600 | 100 | 10.6 | 10.9 | 89.0 | 93.3 | 0.38 | 99.0 | 29.2 | 21.0 | 49.8 | 80.6 | 2 |
| 24 | Diesel/600 | | 100 | 10.9 | 7.8 | 73.3 | 86.8 | 1.43 | 99.0 | 24.5 | 28.5 | 47.0 | 79.0 | 4 |
| 25 | MBC/600 | Dies./600 | 100 | 10.6 | 10.4 | 87.3 | 96.6 | 0.52 | 103.1 | 29.1 | 22.3 | 48.6 | 80.2 | 5 |
| 26 | NP20/600 | Kero/600 | 100 | 10.6 | 3.6 | 47.1 | 92.5 | 1.10 | 101.9 | 30.8 | 33.2 | 35.9 | 86.7 | 7 |
| 27 | PetL/600 | Kero/600 | 100 | 10.5 | 11.0 | 83.0 | 91.0 | 0.74 | 98.9 | 27.5 | 31.9 | 40.6 | 83.7 | 7 |
| 28 | none | none | 100 | 11.0 | 9.1 | 83.1 | 93.2 | 0.53 | 99.4 | 30.4 | 25.7 | 43.9 | 82.4 | 5 |
| 29 | NaOH/300 | Kero/600 | 100 | 11.1 | 4.7 | 69.2 | 92.7 | 0.59 | 99.7 | 42.1 | 21.3 | 36.6 | 89.6 | 10 |
| 30 | DP/DNP/600 | Kero/600 | 100 | 10.8 | 11.4 | 84.4 | 92.4 | 0.59 | 99.5 | 33.3 | 25.4 | 41.3 | 85.6 | 5 |
| 31 | Cresol/600 | Kero/600 | 100 | 10.8 | 10.9 | 85.2 | 94.7 | 0.62 | 102.1 | 28.5 | 21.5 | 50.0 | 79.2 | 6 |
| 32 | SC164p/60 | Kero/600 | 100 | 10.9 | 9.6 | 77.0 | 86.3 | 0.54 | 92.6 | 28.1 | 22.7 | 49.2 | 80.8 | 6 |
| 33 | NaOH/300 | | 180 | 10.7 | 36.6 | 84.7 | 85.3 | 0.37 | 91.0 | 30.9 | 30.3 | 38.8 | 86.6 | 10 |
| 34 | PetHL/600 | Kero/600 | 100 | 10.5 | 11.5 | 89.2 | 94.2 | 0.48 | 100.5 | 31.1 | 17.6 | 51.3 | 81.0 | 6 |
| 35 | NP1-15/60 | Dies./600 | 100 | 10.5 | 2.5 | 26.7 | 65.5 | 2.07 | 83.6 | 32.5 | 21.6 | 45.9 | 88.7 | 3 |
| 36 | TDA150/60 | Kero/600 | 100 | 10.5 | 11.6 | 81.2 | 91.6 | 0.50 | 98.3 | 38.0 | 23.3 | 38.7 | 88.7 | 3 |
| 37 | DP-DNP/600 | Kero/600 | 100 | 10.6 | 14.1 | 88.5 | 93.6 | 0.34 | 99.1 | 37.1 | 25.5 | 37.5 | 88.4 | 2 |
| 38 | DP-DNP/600 | Kero/600 | 100 | 10.5 | 14.7 | 90.5 | 92.8 | 0.34 | 98.4 | 29.1 | 33.0 | 38.0 | 85.3 | 2 |

TABLE VII-continued

Summary of Flotation Results - Additive Screening Tests

| Run No. | Additive 1/ ppm | Additive 2/ppm | Temp. F. | Feed Conc. % (1) | Init. Rate %/min (2) | Recov. @ 20 Min % (3) | Total Recov. % (4) | Tail. Bit. % (5) | Bit. Mat. Bal. % (6) | Product Composition | | | Sand Reject. % (7) | Water Qual @ 24 Hr (8) |
|---|---|---|---|---|---|---|---|---|---|---|---|---|---|---|
| | | | | | | | | | | Bitumen wt. % | Water wt. % | Solids wt. % | | |
| 39 | DP-DNP/ 300 | Kero/600 | 130 | 10.7 | 31.8 | 83.8 | 87.6 | 0.40 | 93.6 | 28.6 | 36.0 | 35.4 | 86.6 | 4 |
| 40 | DP-DNP/ 600 | Kero/600 | 80 | 10.1 | 1.6 | 19.2 | 45.1 | 3.96 | 81.3 | 20.1 | 30.2 | 49.7 | 87.2 | 5 |
| 41 | DP-DNP/ 100 | Kero/600 | 100 | 10.5 | 12.8 | 87.7 | 91.6 | 0.40 | 97.7 | 28.6 | 22.1 | 49.4 | 80.9 | 3 |
| 42 | | Kero/600 | 100 | 10.7 | 11.9 | 84.6 | 91.1 | 0.42 | 97.1 | 31.8 | 27.1 | 41.2 | 85.4 | 3 |

Note
1. Tar sand bitumen concentration, wt %
2. Initial separation rate, wt. % of total bitumen recovered per minute
3. Bitumen recovery after 20 minutes of separation, wt % of total bitumen in feed
4. Total bitumen recovered, wt % of total bitumen in feed
5. Concentration of bitumen in sand remaining after extraction, wt %
6. Total bitumen accounted for in product, tailings, and residue on extraction vessel, % of bitumen in feed. (estimated to
7. Wt % of sand in feed not separated and recovered in product
8. Subjective evaluation of water quality after 24 hrs. 1 = clear, 5 = cloudy, 10 = murky, stable sludge, not suitable for recycle The information presented in Table VII includes the rates of recovery of bitumen at different times throughout the separation period. These rates are expressed as a percentage of the total bitumen present in the feed tar sand. The bitumen remaining in the sand recovered after separation was measured and is shown in the column labeled "Tail. Bit." and is given in wt. % bitumen. The next column in Table VII is labeled "Bit. Mat. Bal" and shown to indicate the comparison between the bitumen in the tar sand feed and the total bitumen in the recovered product, the tailings sand, and in the residue on the walls of the extraction vessel. In most cases, the material balance on bitumen was excellent and generally in the 97% to 103% range. The composition of the product collected is shown and a calculated value for unrecovered solids or 'sand rejection' is also given.

The final column in Table VII is a subjective evaluation of the quality of the water recovered from the extraction vessel after the separation period. The water was collected in quart jars and observed for clarity and suspended solids after approximately 24 hours. The water quality was rated on a scale of 1 to 10 with 10 being a poor quality sludge such as that obtained from a hot water caustic run. Any rating of less than 10 was judged to be probably acceptable for an internal recycle stream in the process.

The results of the test runs are also shown in FIGS. 9 through 13. In these figures the percentage recovery of bitumen is given as a function of time. The first twenty-five minutes of the recovery period are shown since the most dramatic differences between additives occurred during this period and since the initial separation rates are likely to be most important in operation of the hydrocyclone. The results are presented in the order obtained.

EFFECT OF EXTRACTION TEMPERATURE

Figure 14:
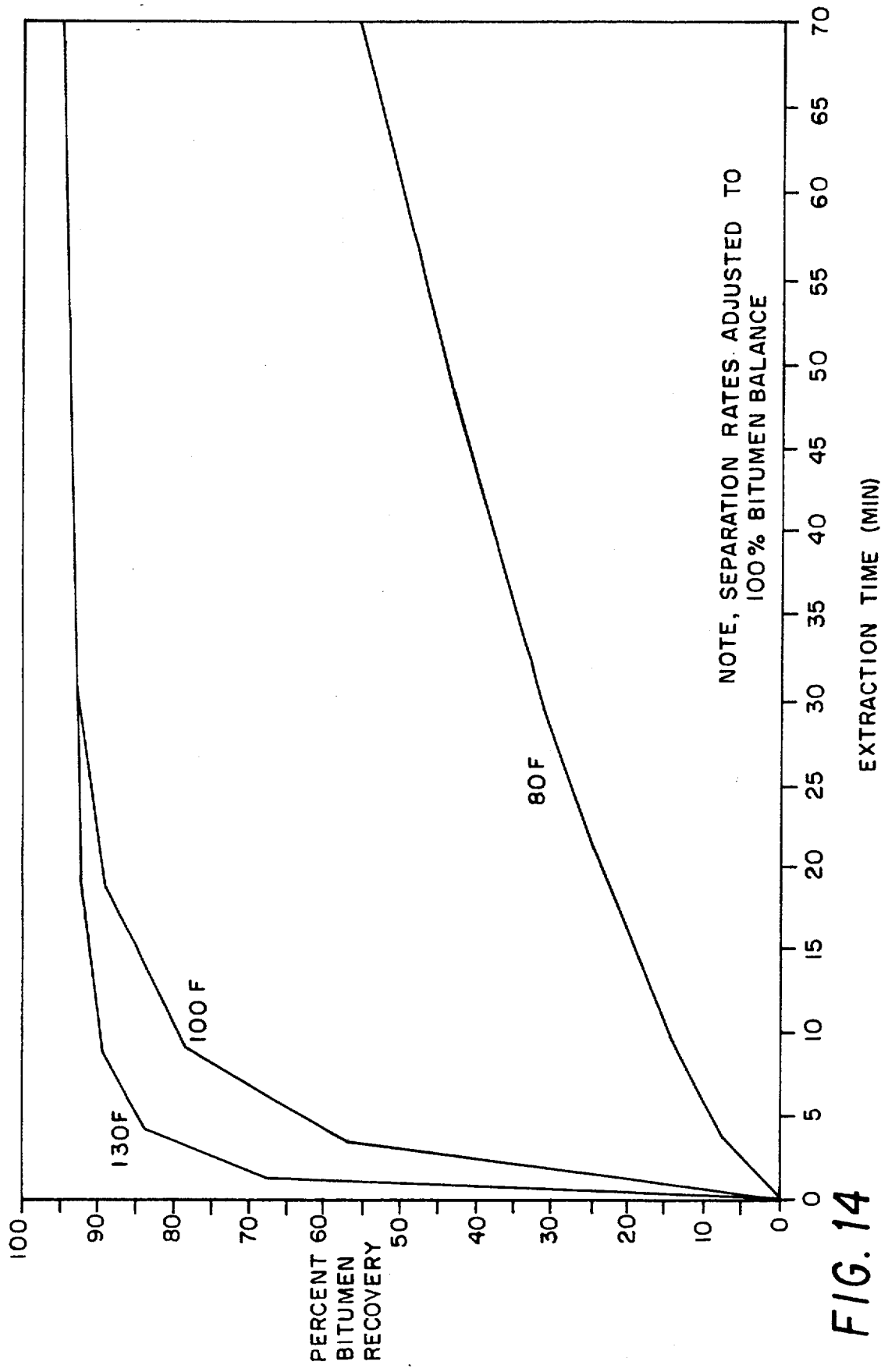
FIG. 14 is a graph of the effect of temperature on separation rate (DP-DNP-150 at 600 ppm, Kero at 600 ppm)

Based on the results of preliminary experiments, a standard test temperature of 100° F. was selected for the screening tests. This operating temperature permitted good recovery of bitumen and the ability to rank the effectiveness of the additives. Three tests were run using DP-DNP-150 and kerosene at 800° F., 100° F. and 130° F. to evaluate the effect of temperature on operations. The results of these tests are shown in the following Table VIII and FIG. 14:

TABLE VIII

Effect of Extraction Temperature on Separation Results

| Run No. | Additive 1/ ppm | Additive 2/ppm | Temp. F. | Feed Conc. % (1) | Init. Rate %/min (2) | Recov. @ 20 Min % (3) | Total Recov. % (4) | Tail. Bit. % (5) | Bit Mat. Bal. % (6) | Product Composition | | | Sand Reject. % (7) | Water Qual. @ 24 Hr (8) |
|---|---|---|---|---|---|---|---|---|---|---|---|---|---|---|
| | | | | | | | | | | Bitumen wt. % | Water wt. % | Solids wt. % | | |
| 40 | DP-DNP/ 600 | Kero/600 | 80 | 10.1 | 1.6 | 19.2 | 45.1 | 3.96 | 81.3 | 20.1 | 30.2 | 49.7 | 87.2 | 5 |
| 37 | DP-DNP/ 600 | Kero/600 | 100 | 10.6 | 14.1 | 88.5 | 93.6 | 0.34 | 99.1 | 37.1 | 25.5 | 37.5 | 88.4 | 2 |
| 39 | DP-DNP/ 600 | Kero/600 | 130 | 10.7 | 31.8 | 83.8 | 87.6 | 0.40 | 93.6 | 28.6 | 36.0 | 35.4 | 86.6 | 4 |

See notes on Tables VI and VII

The operating characteristics of the system vary greatly over this temperature range. The initial separation rate is especially sensitive in this range, varying from 1.6 to 31.8 min. The total recovery of bitumen is less sensitive, with results at 100° F. equal to or better than the 130° F. results. Depending on the characteristics of the hydrocyclone system, it appears that an operating temperature of 100° F. may be adequate to achieve good results. Significantly poorer results are expected to occur as temperature drops below 100° F.

EFFECT OF ADDITIVE CONCENTRATION

Figure 15:
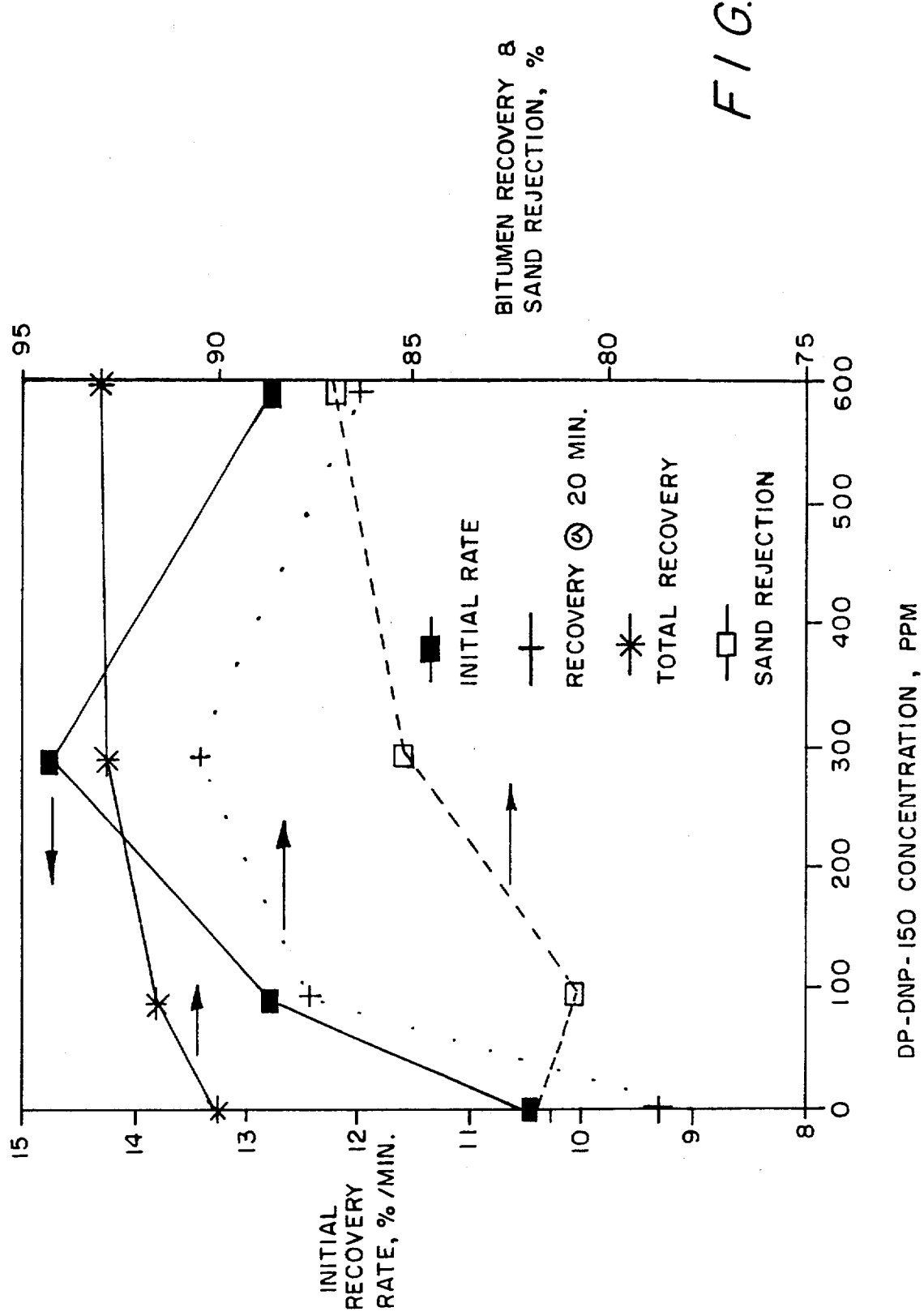
FIG. 15 is a graph of the effect of additive concentration on separation (DP-DNP-150, 0 to 600 ppm, Kero at 600 ppm)

For most of the screening tests, additives were added at a rate of 600 ppm for chemical #2 surfactant and 600 ppm for either kerosene or diesel. In one series of tests using DP-DNP-150 and kerosene the concentration of the DP-DNP-150 component was varied from 0 to 600 ppm with the kerosene concentration held constant at 600 ppm. The results of these tests are shown in the following Table IX and FIG. 15:

TABLE IX

Effect of DP-DNP-150 Concentration on Separation Results

| Run No. | Additive 1/ ppm | Additive 2/ppm | Temp. F. | Feed Conc. % (1) | Init. Rate %/min (2) | Recov. @ 20 Min % (3) | Total Recov. % (4) | Tail. Bit. % (5) | Bit Mat. Bal. % (6) | Product Composition | | | Sand Reject. % (7) | Water Qual @ 24 Hr (8) |
|---|---|---|---|---|---|---|---|---|---|---|---|---|---|---|
| | | | | | | | | | | Bitumen wt. % | Water wt. % | Solids wt. % | | |
| 22-4 | none | Kero/600 | 100 | 10.4 | 10.4 | 78.7 | 90.0 | 0.7 | 98.1 | 27.7 | 26.7 | 45.6 | 81.8 | 2.5 |
| 41 | DP-DNP/100 | Kero/600 | 100 | 10.5 | 12.8 | 87.7 | 91.6 | 0.4 | 97.7 | 28.6 | 22.1 | 49.4 | 80.9 | 3.0 |
| 38 | DP-DNP/300 | Kero/600 | 100 | 10.5 | 14.7 | 90.5 | 92.8 | 0.3 | 98.4 | 29.1 | 33.0 | 38.0 | 85.3 | 2.0 |
| 30-3 | DP-DNP/600 | Kero/600 | 100 | 10.7 | 12.8 | 86.4 | 93.0 | 0.5 | 99.3 | 35.2 | 25.4 | 39.4 | 87.0 | 3.5 |

Notes:
Runs 22 and 42 averaged for 0 ppm results
Runs 30 and 37 averaged for 600 ppm results
See notes on Tables VI and VII As shown the rate of bitumen separation appears to reach a maximum at a concentration in the 300 ppm range. Total recovery of bitumen and sand rejection, however, tend to increase continuously over the range tested. These results indicate that selection of the optimum additive concentration may not be straightforward and may require additional tests in conjunction with economic evaluations. The trends shown here for DP-DNP-150 may also be different for other additives.

RANKING OF FLOTATION ADDITIVES

For purposes of selecting additives to be used in the hydrocyclone test, the results of the screening tests were ranked to determine the best combinations of additives. The criteria used in the ranking process included initial separation rate, total recovery of bitumen, bitumen concentration in the tailings sand, sand rejection, and water quality. Because the hydrocyclone unit operates over a very brief period, the initial separation rate was considered an important factor. The total recovery of bitumen and the tailings concentration indicated the ability of the additive to clean bitumen from the tar sand. Maximizing sand rejection is obviously critical and a minimum level of 80% sand rejection was specified. Finally water quality was considered, but in effect the water quality results from all runs except those in which caustic was used are probably acceptable for an internal recycle stream.

The results of the ranking process are given below with the best additive combination in each category numbered 1.

| Rank | Initial Recovery Rate | Total Recovery of Bitumen | Tailings Bitumen Content | Sand Rejection |
|---|---|---|---|---|
| 1. | DP-DNP-150/Kero | MIBC/Diesel | DP-DNP-150/Kero | TDA150/Kero |
| 2. | MIBC/Diesel | Cresol/Kero | CS104/Kero | NP100-150/Kero |
| 3. | TDA150/Kero | DP-DNP-150/Kero | Kero | DP-DNP-150/Kero |
| 4. | Petronate HL/Kero | MIBC/Kero | MIBC/Kero | NP20/Kero |
| 5. | Shurcoal 177/Diesel | CS104/Kero | none | MIBC/Kero |

EXAMPLE III

The separation of solids from a tar sand slurry may be accomplished without the use of chemical additives or the introduction of air into the slurry. The characteristics of this separation process may be illustrated by predicting the recovery of bitumen in the overhead stream produced by a hydrocyclone to which a tar sand slurry is fed ("The Sizing of Hydrocyclone", R. A. Arterbum, Krebs Engineers).

Figure 16:
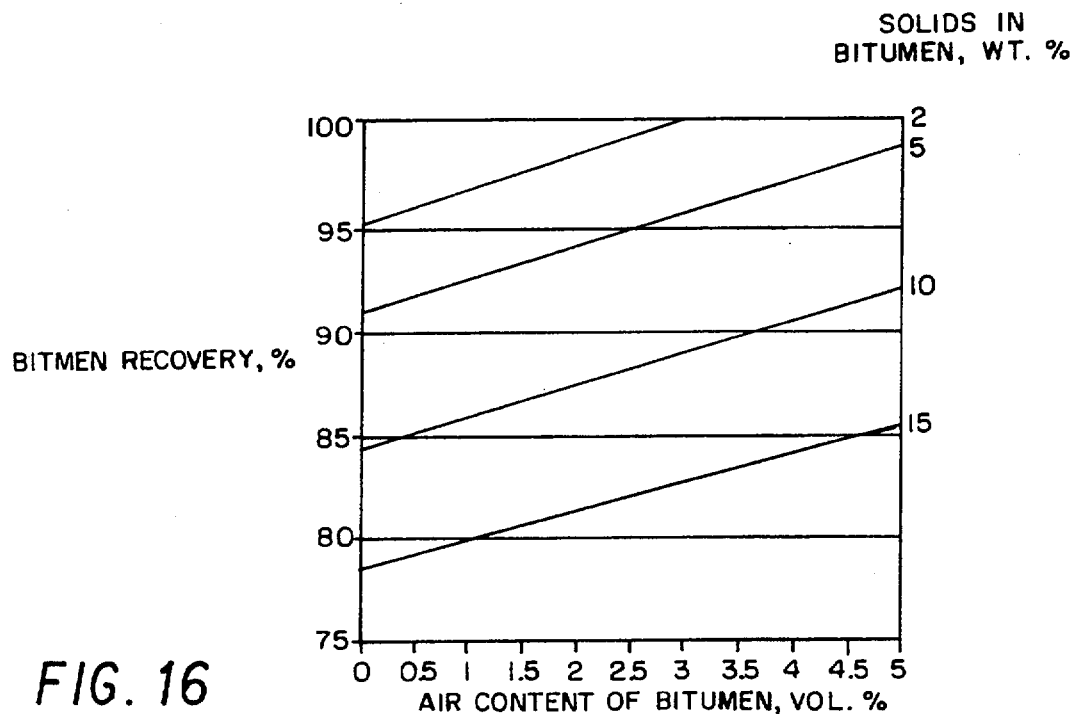
FIG. 16 is a graph of the effect of bitumen air and solids content on bitumen recovery.

Such a prediction is shown in FIG. 16 for a tar sand slurry containing 30 wt percent of an Athabasca sand with a bitumen content of approximately 10 wt percent and in which the bitumen is dispersed with an average droplet size of 30 microns. The separation of bitumen from this system is based on the difference between the density of the water, bitumen and solid phases and the enhanced gravitational field produced in the hydrocyclone. The degree of recovery of bitumen depends on the solids content of the bitumen particles and the quantity of air attached to the bitumen or within the bitumen droplets. FIG. 16 illustrates that with a bitumen solids content of 2 to 5 wt percent and with a bitumen air content of zero, bitumen recoveries of 90 to 95 percent may be achieved.

Pilot test runs using no chemicals demonstrated a bitumen recovery of 91%. Separate tests with no air injection into the slurry showed that exclusion of air from the slurry causes a slight reduction in bitumen recovery of 4 to 5%. Thus it is possible to conservatively recover >80 percent of the bitumen fed to the process without the use of air or chemicals.

EXAMPLE IV

The results of extensive pilot testing using a tar sands slurry feed to a 4 inch Krebs Hydrocyclone is summarized on Table X.

Example IV-1 using 600 ppm of CS85-1 (also described previously as DP-DNP-150, also described as a mixture of ethoxylated dodecyl phenol and dinonyl phenol with 150 ethoxylated groups) and 600 ppm of kerosene resulted in a feed bitumen to product recovery of 91.4 percent.

Examples IV-2 through IV-5 show the effect of the chemical CS 85-1 and indicate an incremental increase of feed bitumen to product of 5.0%, 7.4%, 2.9% and 2.7%.

Examples IV-6 shows the effects of adding 600 ppm of MIBC (methyl-isobutyl-carbinol) to the tar sands slurry feed and results in an incremental increase of feed bitumen to product of 1.6%.

Example IV-7 shows the effects of adding 600 ppm of CS83 (a 50/50 mixture of NP40 and NP100) to the tar sands slurry feed and results in an incremental increase of feed bitumen to product of 4.1%.

Example IV-8 shows the effects of adding 400 ppm of Petronate HL (described previously as a petroleum sulfonate sold under the trademark WITCO Petronate HL) and 400 ppm of Kerosene to the tar sands slurry feed and results in an incremental increase of feed bitumen to product of 6.0%.

Example IV-9 shows the effects of adding 600 ppm of SC-177 (described previously as a $C_6$ to $C_9$ branched aliphatic alcohol and/or ketones sold under the trademark Sherex Shurcoal 177) and 600 ppm of kerosene to the tar sands slurry feed and results in an incremental increase of feed bitumen to product of 7.7%.

Example IV-10 shows the effects of adding 450 ppm of calcium lignosulfonate (sold under the trade name Lignosite Road Binder 50% by Georgia-Pacific) and 450 ppm of kerosene to the tar sands slurry feed and results in an incremental increase of feed bitumen to product of 2.3%.

Examples IV-11 and IV-12 show the effect of including air injection, i.e., increasing air from 0 to 2.5 SCFM to the tar sands slurry feed and results in an incremental increase of feed bitumen to product of 7.7% to 12.5% and 3.8% respectively.

Example IV-13 shows the effect of increasing tar sands slurry feed temperature from 42° C. to 59° C. on bitumen recovery and results in an incremental increase of feed bitumen to product of 4.3%.

Example IV-14 shows the effects of increasing tar sands slurry feed concentration. Increasing slurry concentration from 20% to 40% reduces bitumen recovery by approximately 10%.

Example IV-15 shows the effects of the mixer position in the feed loop. Bitumen recovery improves by 2.1% after moving the mixer closer to the tumbler position i.e., upstream of the 100 foot loop.

Example IV-16 shows the effect of a 100 foot length of pipe in the feed to the hydrocyclone. Adding 100 feet of piping improves tar sands slurry mixing and improves bitumen recovery by 6.0%.

Example IV-17 shows that bitumen recovery is insensitive to slurry flow rate over the range tested.

TABLE X

EXAMPLE IV -- RESULTS AND SUMMARY OF PILOT PLANT TESTING OF 4 INCH KREBS HYDROCYCLONE

| Example Number | Objective | | Run Number | Chemical 1/ppm | Chemical 2/ppm | Feed Bitumen to Product | Comments |
|---|---|---|---|---|---|---|---|
| EFFECTS OF CHEMICALS | | | | | | | |
| IV-1 | Determine Bitumen Recovery with CS 85-1 | | 1 | CS 85-1/600 | Kero/600 | 91.4% | Used tar sand #1 |
| IV-2 | Determine effect of CS 85-1 | | 9 thru 17 | 0 | Kero/600 | 79.4 | CS85-1 gives 5.0% greater recovery |
| | | | 18 thru 20 | CS85-1/300 | Kero/600 | 84.4 | |
| IV-3 | Determine effect of CS 85-1 | | 51 | 0 | Kero/600 | 76 | CS85-1 gives 7.4% greater recovery |
| | | | 49 + 53 | CS85-1/250 | Kero/600 | 83.4 | |
| IV-4 | Determine effect of CS 85-1 | | 57 | 0 | 0 | 80.5 | CS85-1 without Kero gives 2.9% greater recovery |
| | | | 55 + 58 | CS85-1/200 | 0 | 83.4 | |
| IV-5 | Determine effect of CS 85-1 | | 66 | 0 | 0 | 90.9 | CS85-1 with Kero gives 2.7% greater recovery |
| | | | 67,68,69,72 | CS85-1/300 | Kero/600 | 93.6 | |
| IV-6 | Determine effect of MIBC | | 35,36 | 0 | Kero/600 | 78.7 | MIBC gives 1.6% greater recovery |
| | | | 37,38 | MIBC/600 | Kero/600 | 80.3 | |
| IV-7 | Determine effect of CS 83 | | 43 | 0 | Kero/600 | 85.9 | CS83 gives 4.1% greater recovery |
| | | | 45–48 | CS83/600 | Kero/600 | 90.0 | |
| IV-8 | Determine effect of Petronate HL | | 73 | 0 | 0 | 84.1 | Petronate HL + Kero give 6% greater recovery |
| | | | 74,75 | Pet HL/400 | Kero/400 | 90.1 | |
| V-9 | Determine effect of SC-177 | | 86 | 0 | 0 | 83.8 | SC-177 + Kero gives 7.7% greater recovery |
| | | | 82,83 | SC-177/600 | Kero/600 | 91.5 | |
| IV-10 | Determine effect of Calcium Lignosulfonate | | 88 | 0 | 0 | 83.7 | Calcium Lignosulfonate + Kero gives 2.3% greater recovery |
| | | | 89,90 | Ligno/450 | Kero/450 | 86 | |
| Effects of Air | | | | | | | |
| IV-11 | Determine effect of Air Injection | 0 SCFM | 13 | 0 | Kero/600 | 70.4 | Including air raised bitumen recovery by 7.7 to 12.5% |
| | | 2.5 SCF | 14–17 | 0 | Kero/600 | 82.9 | |
| | | 2.5 SCF | 9–12 | 0 | Kero/600 | 78.1 | |
| IV-12 | Determine effect of Air Injection | 2.5 SCFM | 63 | CS 83/200 | Kero/600 | 90.6 | Increasing air from 0 to 2.5 SCFM increased bitumen recovery by 3.8% |
| | | 0 SCFM | 64 | CS 83/200 | Kero/600 | 86.8 | |
| Effects of Temperature | | | | | | | |
| IV-13 | Determine effect of treating temperature | 42° C. | 87 | SC-177/600 | Kero/600 | 88 | Increasing temperature increases bitumen recovery, i.e., Δ17° C. = 4.3% |
| | | 53° C. | 83 | SC-177/600 | Kero/600 | 90.7 | |
| | | 59° C. | 82 | SC-177/600 | Kero/600 | 92.3 | |
| Effects of Concentration | | Conc. % | | | | | |
| IV-14 | Determine effect of tar sand slurry concentration to FSU | 20 | 30 | CS 85-1/300 | Kero/600 | 88.3 | Increasing slurry concentration from 20 to 40% reduces bitumen recovery approximately 10% |
| | | 25 | 31 | CS 85-1/300 | Kero/600 | 88.4 | |
| | | 30 | 32 | CS 85-1/300 | Kero/600 | 89.1 | |
| | | 35 | 33 | CS 85-1/300 | Kero/600 | 83.8 | |
| | | 40 | 34 | CS 85-1/300 | Kero/600 | 78.7 | |
| Effects of Mixer Position | | | | | | | |
| IV-15 | Determine effects of mixer position | After Loop | 79 | CS 85-1/300 | Kero/600 | 90 | Recovery improves by moving the mixer closer to the tumbler i.e., up-stream of the loop |
| | | Before Loop | 76 | CS 85-1/300 | Kero/600 | 92.1 | |
| Effects of Length of Piping on Mixing | | | | | | | |
| IV-16 | Determine effect length of pipe has on mixing | No Loop | 16 | 0 | Kero/600 | 80.2 | 100 feet of piping improves the bitumen recovery by 6.0% |
| | | 100 ft. | 17 | 0 | Kero/600 | 86.2 | |
| Effects of Flow Rate | | | | | | | |
| IV-17 | Determine effect of Slurry Flow Rate | 16.3 GPM | 5 | CS 85-1/300 | Kero/600 | 89.6 | Bitumen recovery is insensitive to slurry flow rate over range tested |
| | | 20.1 GPM | 8 | CS 85-1/300 | Kero/600 | 88.2 | |
| | | 16.5 | 9–11 | 0 | Kero/600 | 78.8 | |

TABLE X-continued

| EXAMPLE IV – RESULTS AND SUMMARY OF PILOT PLANT TESTING OF 4 INCH KREBS HYDROCYCLONE | | | | | | |
|---|---|---|---|---|---|---|
| Example Number | Objective | Run Number | Chemical 1/ppm | Chemical 2/ppm | Feed Bitumen to Product | Comments |
| | 20.4 | 16 | 0 | | Kero/600 | 80.2 |

EXAMPLE V

Figure 17:
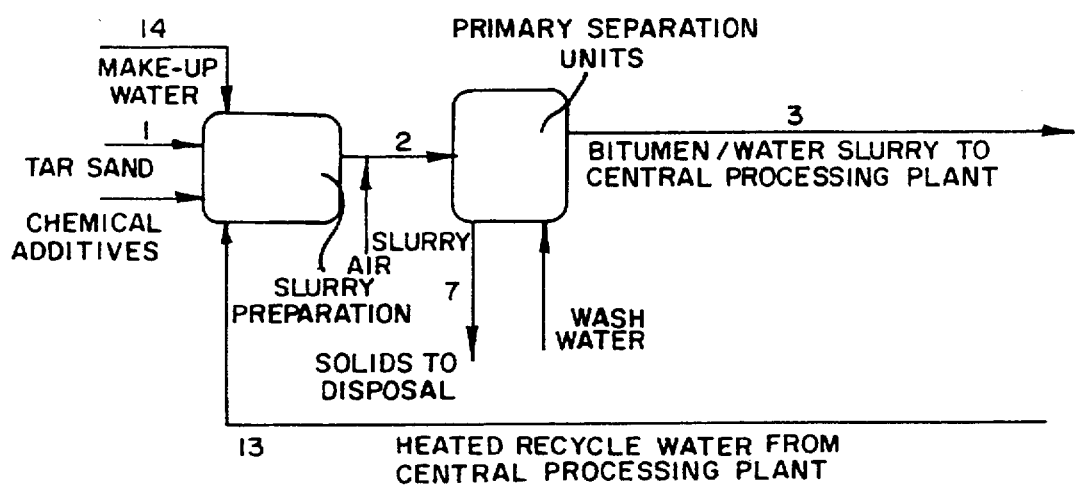
FIG. 17 is a simplified process flow diagram of sand reduction with bitumen/water transportation to control processing plant for concentration and processing plant for concentration and processing.

FIG. 17 illustrates a process option in which the benefits of the invention are achieved with minimum capital investment and operating costs. The objective of this option is to reduce the sand content of a tar sand feed to a central processing plant by removing the bulk of the sand at a remote mine site. The bitumen retained in the sand reduction process is then transported to the central processing plant as bitumen/water stream containing 50% to 90% water by weight.

This process option incorporates two primary components: (1) Slurry Preparation and (2) Primary Separation. The slurry preparation step is identical to that described in Example 1 and involves mixing of the raw tar sand with water and chemicals and heating to the desired operating temperature followed by agitation.

Slurry preparation is followed by injection of air into the slurry, mixing in a pipeline or mixer and injected into the primary separation units. In these units the bulk of the sand particles are rejected as a tailings stream and the bitumen is retained with the water used to prepare the slurry. The separated bitumen/water stream is then pumped to the central processing plant which uses conventional technology for bitumen-water separation. The recovered water may be heated and recycled to the remote sand reduction process for further use in slurry preparation.

The following Table XI illustrates typical rates for a system with a feed note of 1000 tons/day of tar sand to the process depicted in FIG. 17.

TABLE XI

| | FLOW RATES, LBS/HR | | | | | |
|---|---|---|---|---|---|---|
| | 1 Tar Sand Feed | 2 Tar Sand Slurry | 3 Bitumen/ Water | 7 FSU Tails | 13 Recycle Water | 14 Make-up Water |
| Tar Sand, (tons/day) | 1000 | | | | | |
| Bitumen | 8467 | 8467 | 7620 | 847 | | |
| Solids > 44 microns | 67189 | 67189 | 2016 | 65173 | | |
| Solids < 44 microns | 4061 | 4061 | 3574 | 487 | | |
| Water | 3617 | 119575 | 54761 | 64814 | 54761 | 61197 |
| Total | 83333 | 199292 | 67971 | 131321 | 54761 | 61197 |

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

We claim:

1. A process for recovering a hydrocarbon from a hydrocarbon bearing sand comprising the steps of:

(a) mixing a chemical additive with a chemical composition and with a hydrocarbon bearing sand containing hydrocarbon and residual solids including clay, at a temperature to form a slurry, wherein said chemical composition comprises an aqueous phase and a minor amount of a chemical agent selected from the group consisting of at least one ethoxylated alkylphenol compound, at least one ethoxylated dialkylphenol compound and mixtures thereof;

(b) aerating the formed slurry of step (a) to a rate ranging from about 0.1 SCF of air per gallon of formed slurry to about 1.0 SCF of air per gallon of formed slurry to produce essentially sludge-free tailings and a mixture of hydrocarbon, aqueous phase and residual solids including clay not containing a sodium ion;

(c) separating with an enhanced gravity separator said mixture of said hydrocarbon, said aqueous phase and said residual solids including clay from the essentially sludge-free tailings.

2. The process of claim 1 wherein
said chemical agent comprises at least one ethoxylated alkylphenol compound having the general formula:

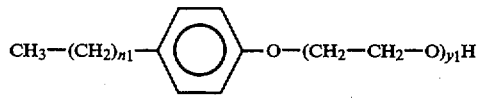

wherein $n_1$ is an integer having a value of from about 7 to about 20, and $y_1$ is an integer having a value of from about 4 to about 1000; and said at least one ethoxylated alkylphenol compound has a molecular weight distribution with a dispersity of from about 1.0 to about 5.0 and with a weight average molecular weight of from about 1966 to about 9188; and wherein at lest about 50% by weight of the chemical agent comprises said at least one ethoxylated alkylphenol compound having a molecular weight of from about 1966 to about 9188.

3. The process of claim 2 wherein from 1% by weight to 90% by weight of the chemical agent comprises said at least one ethoxylated alkylphenol compound wherein $y_1$ has a value greater than 100.

4. The process of claim 1 wherein said chemical agent comprises from about 30% by weight to about 80% by weight of said at least one ethoxylated alkylphenol compound, and said chemical agent additionally comprises at least one ethoxylated dialkylphenol compound having the general formula:

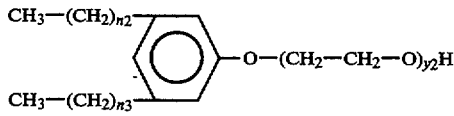

wherein $n_2$ is an integer having a value of from about 7 to about 18, and $n_3$ is an integer having a value of from about 7 to about 18, and $y_2$ is an integer having a value of from about 4 to about 1000; and wherein said at least one ethoxylated dialkylphenol compound and said at least one ethoxylated alkylphenol compound have a molecular weight distribution with a dispersity of from about 1.0 to about 5.0 and with a weight average molecular weight of from about 1966 to about 11,627; and wherein at least about 50% by weight of the chemical agent comprises said at least one ethoxylated alkylphenol compound having at least one ethoxylated dialkylphenol compound having a molecular weight of from about 2519 to about 11,627; and from 1% by weight to 90% by weight of the chemical agent comprises said at least one ethoxylated dialkylphenol compound wherein $y_2$ is greater than 100.

5. The process of claim 1 wherein said separating step (c) comprises introducing the produced essentially sludge-free tailings and produced mixture of hydrocarbon, aqueous phase, and residual solids including clay into a hydrocyclone.

6. The process of claim 1 additionally comprising heating said aqueous phase prior to mixing said chemical additive with said hydrocarbon bearing sand.

7. The process of claim 1 additionally comprising separating said aqueous phase from said residual solids including clay and recycling said separated aqueous phase for admixing with said chemical additive and with said emulsifying composition and with said hydrocarbon bearing sand.

8. The process of claim 1 additionally comprising agitating said formed slurry of step (a) prior to said aerating step (b).

9. The process of claim 8 additionally comprising agitating said aerated slurry of step (b) prior to said separating step (c).

10. The process of claim 1 wherein said chemical additive is selected from the group consisting of kerosene, diesel oil and mixtures thereof.

11. A process for recovering bitumen from tar sands comprising the steps of:
(a) mixing a chemical additive with a chemical agent and with an aqueous phase and with tar sands containing bitumen and residual solids including clay, at a temperature to form a slurry, wherein said chemical agent is selected from the group consisting of at least one ethoxylated alkylphenol compound, at least one ethoxylated dialkylphenol compound and mixtures thereof;
(b) pumping the formed slurry of step (a) towards at least one mixer;
(c) aerating the pumped slurry of step (b) with air at a rate ranging from about 1 to about 20 SCF of air/minute to assist in the production of essentially sludge-free tailings and a mixture of bitumen, aqueous phase and residual solids including clay;
(d) agitating the aerated slurry of step (c) with said at least one mixer to further assist in the produce of essentially sludge-free tailings and said mixture of bitumen, aqueous phase and residual solids including clay not containing a sodium ion;
(e) separating with at least one first separator said mixture of said bitumen and said aqueous phase and said residual solids including clay from the agitated slurry of step (d) to produce essentially sludge-free tailings; and
(f) separating said aqueous phase and said residual solids including clay from said step (e) mixture comprising said bitumen, said residual solids including clay, and said aqueous phase to produce said bitumen as being essentially free of residual solids including clay.

12. The process of claim 11 wherein said chemical agent comprises at least one ethoxylated alkylphenol compound having the general formula:

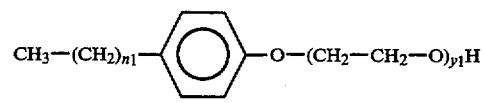

wherein $n_1$ is an integer having a value of from about 7 to about 20, and $y_1$ is an integer having a value of from about 4 to about 1000; and said at least one ethoxylated alkylphenol compound has a molecular weight distribution with a dispersity of from about 1.0 to about 5.0 and with a weight average molecular weight of from about 1966 to about 9188; and wherein at least about 50% by weight of the chemical agent comprises said at least one ethoxylated alkylphenol compound having a molecular weight of from about 1966 to about 9188.

13. The process of claim 11 wherein said chemical agent comprises from about 30% by weight to about 80% by weight of said at least one ethoxylated alkylphenol compound, and said chemical agent additionally comprises at least one ethoxylated dialkylphenol compound having the general formula:

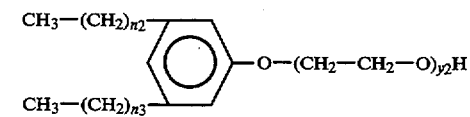

wherein $n_2$ is an integer having a value of from about 7 to about 18, and $n_3$ is an integer having a value of from about 7 to about 18, and $y_2$ is an integer having a value of from about 4 to about 1000; and wherein said at least one ethoxylated dialkylphenol compound and said at least one ethoxylated alkylphenol compound have a molecular weight distribution with a dispersity of from about 1.0 to about 5.0 and with a weight average molecular weight of from about 1966 to about 11,627; and wherein at least about 50% by weight of the chemical agent comprises said at least one ethoxylated alkylphenol compound having at least one ethoxylated dialkylphenol compound having a molecular weight of from about 2519 to about 11,627; and from 1% by weight to 90% by weight of the chemical agent comprises said at least one ethoxylated dialkylphenol compound wherein $y_2$ is greater than 100.

14. A process for the extraction and recovery of a hydrocarbon from water wet tar sands comprising:
(a) introducing a water wet tar sand and water into a conditioning zone to form a tar sand slurry;

(b) agitating the formed tar sand slurry of step (a) to form an agitated tar sand slurry;

(c) aerating the formed agitated tar sand slurry to form an aerated tar sand slurry comprising water, hydrocarbon and solids; and (d) separating in less than about five seconds essentially all of the solids from the hydrocarbon and water of the aerated tar sand slurry to produce a hydrocarbon and water mixture comprising residual solids; and (e) separating essentially all of the hydrocarbon and residual solids from the hydrocarbon and water mixture of step (d); and (f) introducing said produced hydrocarbon and residual solids of step (e) into an upgrading unit.

15. The process of claim 14 wherein said separating step (d) comprises introducing the aerated tar sand of step (c) directly into a hydrocyclone without passing the aerated tar sand through a flotation cell.

16. The process of claim 15 wherein said tar sand slurry of step (a) contains no pH controlling agent.

17. The process of claim 14 additionally comprising introducing a chemical additive into the conditioning zone of step (a) along with the water wet tar sand and the water.

18. The process of claim 17 wherein one of the chemical additives is selected from a group consisting of MIBC, SC-177, Petronate HL, Calcium Lignosulfonate, CS 104, DP-DNP-150; and a second chemical additive is from kerosene and/or diesel.

19. The process of claim 14 additionally comprising introducing said separated hydrocarbon into a primary separator.

20. The process of claim 14 in which the tar sand slurry of step (a) is aerated by injection of pressurized water saturated with air.

21. The process of claim 19 in which the solids separated in step (c) is deposited at a tar sand mine site.

22. The process of claim 14 wherein said separating step (d) comprises introducing the aerated tar sand of step (c) directly into a hydrocyclone.

23. The process of claim 14 additionally comprising admixing a chemical additive with the tar sand slurry of step (a), said chemical additive being selected from a group consisting of MICB, SC-177, Petronate HL, Calcium Lignosulfonate, CS 104, DP-DNP-150, kerosene diesel, and mixtures thereof.

24. A process for recovering a hydrocarbon from a hydrocarbon bearing sand comprising the steps of:
(a) mixing a chemical additive with a chemical composition and with a hydrocarbon bearing sand containing hydrocarbon and residual solids including clay, at a temperature to form a slurry, wherein said chemical composition comprises an aqueous phase and a minor amount of a chemical agent selected from the group consisting of at least one ethoxylated alkylphenol compound, at least one ethoxylated dialkylphenol compound and mixtures thereof;
(b) aerating the formed slurry of step (a) to produce essentially sludge-free tailings and a mixture of hydrocarbon, aqueous phase and residual solids including clay, said residual solids including clay in said mixture does not contain a sodium ion from caustic;
(c) separating said mixture of said hydrocarbon, said aqueous phase and said residual solids including clay from the essentially sludge-free tailings.

25. The process of claim 24 additionally comprising separating said step (c) mixture to produce hydrocarbon containing minor amounts of clays and aqueous phase; and upgrading said produced hydrocarbon containing minor amounts of clays and aqueous phase.

26. A process for recovering a hydrocarbon from a hydrocarbon bearing sand comprising the steps of:
(a) mixing a chemical additive with a chemical composition and with a hydrocarbon bearing sand containing hydrocarbon and residual solids including clay, at a temperature to form a slurry, wherein said chemical composition comprises an aqueous phase and a minor amount of a chemical agent selected from the group consisting of at least one ethoxylated alkylphenol compound, at least one ethoxylated dialkylphenol compound and mixtures thereof;
(b) aerating the formed slurry of step (a) to produce essentially sludge-free tailings and a mixture of hydrocarbon, aqueous phase and residual solids including clay;
(c) separating said mixture of said hydrocarbon, said aqueous phase and said residual solids including clay from the essentially sludge-free tailings;
(d) separating said step (c) mixture to produce hydrocarbon containing minor amounts of clays and aqueous phase; and
(e) upgrading said produced hydrocarbon containing minor amounts of clays and aqueous phase.

27. A process for recovering bitumen from tar sands comprising the steps of:
(a) mixing a chemical additive with an aqueous phase sand with tar sands containing bitumen and residual solids including clay, at a temperature to form a slurry;
(b) pumping the formed slurry of step (a) towards at least one mixer;
(c) aerating the pumped slurry of step (b) to assist in the production of essentially sludge-free tailings and a mixture of bitumen, aqueous phase and residual solids including clay;
(d) agitating the aerated slurry of step (c) with said at least one mixer to further assist in the produce of essentially sludge-free tailings and said mixture of bitumen, aqueous phase and residual solids including clay;
(e) separating with at least one first separator said mixture of said bitumen and said aqueous phase and said residual solids including clay from the agitated slurry of step (d) to produce essentially sludge-free tailings having residual bitumen and water; and
(f) passing said essentially sludge-free tailings having residual bitumen and water into at least one second separator to separate residual bitumen and water from the sludge-free tailings and produce coarse solids;
(g) admixing said residual bitumen and water of step (f) with said mixture of said bitumen, said aqueous phase and said residual solids including clay to produce an admixture; and
(h) passing said admixture of step (g) into a third separator to separate said admixture and produce bitumen as being essentially free of residual solids including clay, and water and fines.

28. The process of claim 27 additionally comprising upgrading said produced step (h) bitumen as being essentially free of residual solids including clay.

29. The process of claim 28 additionally comprising passing the water and fines into a fourth separator to separate fines from the water.

30. The process of claim 29 additionally comprising admixing the coarse solids of step (f) with the separated fines and disposing the coarse solids and separated fines.

31. The process of claim 30 additionally comprising admixing the separated water with the aqueous phase of step (a).

32. The process of claim 27 additionally comprising passing the water and fines into a fourth separator to separate fines from the water.

33. The process of claim 32 additionally comprising admixing the separated water with the aqueous phase of step (a).

34. The process of claim 33 additionally comprising admixing the separated water with the aqueous phase of step (a).

35. A process for recovering a hydrocarbon from a hydrocarbon bearing sand comprising the steps of:
  (a) mixing a chemical additive with a chemical composition and with a hydrocarbon bearing sand containing hydrocarbon and residual solids including clay, at a temperature to form a slurry, wherein said chemical composition comprises an aqueous phase and a minor amount of a chemical agent selected from the group consisting of at least one ethoxylated alkylphenol compound, at least one ethoxylated dialkylphenol compound and mixtures thereof;
  (b) aerating the formed slurry of step (a) to produce essentially sludge-free tailings and a mixture of hydrocarbon, aqueous phase and residual solids including clay;
  (c) separating said mixture of said hydrocarbon, said aqueous phase and said residual solids including clay from the essentially sludge-free tailings;
  (d) separating said aqueous phase and said residual solids including clay form said step (c) mixture comprising said hydrocarbon, said residual solids including clay, and said aqueous phase to produce said hydrocarbon as being essentially free of residual solids including clay; and
  (e) upgrading said produced hydrocarbon being essentially free of residual solids including clay.

36. The process of claim 35 wherein said separating step (c) comprises introducing the produced essentially sludge-free tailings and produced mixture of hydrocarbon, aqueous phase, and residual solids including clay into a hydrocyclone.

37. The process of claim 35 additionally comprising heating said aqueous phase prior to mixing said chemical additive with said hydrocarbon bearing sand.

38. The process of claim 35 wherein said residual solids including clay in said mixture of step (b) does not contain a sodium ion.

39. The process of claim 35 additionally comprising separating said aqueous phase from said residual solids including clay and recycling said separated aqueous phase for admixing with said chemical additive and with said emulsifying composition and with said hydrocarbon bearing sand.

40. The process of claim 35 additionally comprising agitating said formed slurry of step (a) prior to said aerating step (b).

41. The process of claim 40 additionally comprising agitating said aerated slurry of step (b) prior to said separating step (c).

42. The process of claim 35 wherein said chemical additive is selected from the group consisting of kerosene, diesel oil and mixtures thereof.

* * * * *